US008861746B2

(12) United States Patent
Sekiya et al.

(10) Patent No.: US 8,861,746 B2
(45) Date of Patent: Oct. 14, 2014

(54) SOUND PROCESSING APPARATUS, SOUND PROCESSING METHOD, AND PROGRAM

(75) Inventors: Toshiyuki Sekiya, Tokyo (JP); Keiichi Osako, Tokyo (JP); Mototsugu Abe, Kanagawa (JP)

(73) Assignee: Sony Corporation, Tokyo (JP)

( * ) Notice: Subject to any disclaimer, the term of this patent is extended or adjusted under 35 U.S.C. 154(b) by 416 days.

(21) Appl. No.: 13/041,638

(22) Filed: Mar. 7, 2011

(65) Prior Publication Data

US 2011/0228951 A1 Sep. 22, 2011

(30) Foreign Application Priority Data

Mar. 16, 2010 (JP) ................................ P2010-059623

(51) Int. Cl.
*H04B 15/00* (2006.01)
*G10L 21/0208* (2013.01)
*G10L 21/0232* (2013.01)

(52) U.S. Cl.
CPC ......... *G10L 21/0208* (2013.01); *G10L 21/0232* (2013.01)
USPC .......... 381/94.1; 381/94.2; 381/94.7; 381/92; 381/71.1; 381/73.1; 704/200; 704/205; 704/208; 704/226

(58) Field of Classification Search
USPC .............. 381/94.1, 94.2, 94.7, 92, 71.1, 73.1; 704/200, 205, 226, 208
See application file for complete search history.

(56) References Cited

U.S. PATENT DOCUMENTS

| | | | |
|---|---|---|---|
| 6,339,758 B1 | 1/2002 | Kanazawa et al. | |
| 6,549,630 B1 * | 4/2003 | Bobisuthi | 381/94.7 |
| 2002/0138254 A1 | 9/2002 | Isaka et al. | |
| 2008/0075300 A1 * | 3/2008 | Isaka | 381/94.2 |
| 2009/0067642 A1 | 3/2009 | Buck et al. | |

FOREIGN PATENT DOCUMENTS

| | | |
|---|---|---|
| JP | 3677143 B2 | 5/2005 |
| JP | 4163294 B2 | 8/2008 |
| JP | 2009-49998 A | 3/2009 |

* cited by examiner

*Primary Examiner* — Paul Kim
(74) *Attorney, Agent, or Firm* — Sony Corporation

(57) ABSTRACT

A sound processing apparatus includes a target sound emphasizing unit configured to acquire a sound frequency component by emphasizing target sound in input sound in which the target sound and noise are included, a target sound suppressing unit configured to acquire a noise frequency component by suppressing the target sound in the input sound, a gain computing unit configured to compute a gain value to be multiplied by the sound frequency component using a gain function that provides a gain value and has a slope that are less than predetermined values when an energy ratio of the sound frequency component to the noise frequency component is less than or equal to a predetermined value, and a gain multiplier unit configured to multiply the sound frequency component by the gain value computed by the gain computing unit.

20 Claims, 22 Drawing Sheets

SOUND PROCESSING APPARATUS, SOUND PROCESSING METHOD, AND PROGRAM

BACKGROUND OF THE INVENTION

1. Field of the Invention

The present invention relates to a sound processing apparatus, a sound processing method, and a program.

2. Description of the Related Art

A technique in which noise is suppressed from input sound including the noise in order to emphasize target sound has been developed (refer to, for example, Japanese Patent No. 3677143, Japanese Patent No. 4163294, and Japanese Unexamined Patent Application Publication No. 2009-49998). In Japanese Patent No. 3677143, Japanese Patent No. 4163294, and Japanese Unexamined Patent Application Publication No. 2009-49998, by assuming that a sound frequency component obtained after the target sound is emphasized includes the target sound and noise and the noise frequency component includes only the noise and subtracting the power spectrum of the noise frequency component from the power spectrum of the sound frequency component, the noise can be removed from the input sound.

SUMMARY OF THE INVENTION

However, in the technique described in Japanese Patent No. 3677143, Japanese Patent No. 4163294, and Japanese Unexamined Patent Application Publication No. 2009-49998, particular distortion called musical noise may occur in the processed sound signal. In addition, noise included in the sound frequency component may not be the same as noise included in the noise frequency component. Thus, a problem in that noise is not appropriately removed may arise.

Accordingly, the present invention provides a novel and improved sound processing apparatus, a sound processing method, and a program capable of performing sound emphasis so that musical noise is reduced by using a predetermined gain function.

According to an embodiment of the present invention, a sound processing apparatus includes a target sound emphasizing unit configured to acquire a sound frequency component by emphasizing target sound in input sound in which the target sound and noise are mixed, a target sound suppressing unit configured to acquire a noise frequency component by suppressing the target sound in the input sound, a gain computing unit configured to compute a gain value to be multiplied by the sound frequency component using a predetermined gain function in accordance with the sound frequency component and the noise frequency component, and a gain multiplier unit configured to multiply the sound frequency component by the gain value computed by the gain computing unit. The gain computing unit computes the gain value using a gain function that provides a gain value and has a slope that are less than predetermined values when an energy ratio of the sound frequency component to the noise frequency component is less than or equal to a predetermined value.

The sound frequency component includes a target sound component and a noise component. The gain multiplier unit can suppress the noise component included in the sound frequency component by multiplying the sound frequency component by the gain value.

The gain computing unit can presume that only noise is included in the noise frequency component acquired by the target sound suppressing unit and compute the gain value.

The gain function can provide a gain value less than a predetermined value and have a gain curve with a slope less than a predetermined value in a noise concentration range in which a noise ratio is concentrated in terms of an energy ratio of the sound frequency component to the noise frequency component.

The gain function can have a gain curve with a slope that is smaller than the greatest slope of the gain function in a range other than the noise concentration range.

The sound processing apparatus can further include a target sound period detecting unit configured to detect a period for which the target sound included in the input sound is present. The gain computing unit can average a power spectrum of the sound frequency component acquired by the target sound emphasizing unit and a power spectrum of the noise frequency component acquired by the target sound suppressing unit in accordance with a result of detection performed by the target sound period detecting unit.

The gain computing unit can select a first smoothing coefficient when a period is a period for which the target sound is present as a result of the detection performed by the target sound period detecting unit and select a second smoothing coefficient when a period is a period for which the target sound is not present, and the gain computing unit can average the power spectrum of the sound frequency component and the power spectrum of the noise frequency component.

The gain computing unit can average the gain value using the averaged power spectrum of the sound frequency component and the averaged power spectrum of the noise frequency component.

The sound processing apparatus can further include a noise correction unit configured to correct the noise frequency component so that a magnitude of the noise frequency component acquired by the target sound suppressing unit corresponds to a magnitude of a noise component included in the sound frequency component acquired by the target sound emphasizing unit. The gain computing unit can compute a gain value in accordance with the noise frequency component corrected by the noise correction unit.

The noise correction unit can correct the noise frequency component in response to a user operation.

The noise correction unit can correct the noise frequency component in accordance with a state of detected noise.

According to another embodiment of the present invention, a sound processing method includes the steps of acquiring a sound frequency component by emphasizing target sound in input sound in which the target sound and noise are mixed, acquiring a noise frequency component by suppressing the target sound in the input sound, computing a gain value to be multiplied by the sound frequency component using a gain function that provides a gain value and has a slope that are less than predetermined values when an energy ratio of the sound frequency component to the noise frequency component is less than or equal to a predetermined value, and multiplying the sound frequency component by the gain value computed by the gain computing unit.

According to still another embodiment of the present invention, a program includes program code for causing a computer to function as a sound processing apparatus including a target sound emphasizing unit configured to acquire a sound frequency component by emphasizing target sound in input sound in which the target sound and noise are included, a target sound suppressing unit configured to acquire a noise frequency component by suppressing the target sound in the input sound, a gain computing unit configured to compute a gain value to be multiplied by the sound frequency component using a predetermined gain function in accordance with the sound frequency component and the noise frequency component, and a gain multiplier unit configured to multiply the sound frequency component by the gain value computed by the gain computing unit. The gain computing unit computes the gain value using a gain function that provides a gain value and has a slope that are less than predetermined values when an energy ratio of the sound frequency component to the noise frequency component is less than or equal to a predetermined value.

As described above, according to the embodiments of the present embodiment, by using a predetermined gain function, sound can be emphasized while reducing musical noise.

DESCRIPTION OF THE PREFERRED EMBODIMENTS

Exemplary embodiments of the present invention are described in detail below with reference to the accompanying drawings. Note that as used herein, the same numbering will be used in describing components having substantially the same function and configuration and, thus, descriptions thereof are not repeated.

The descriptions of the exemplary embodiments are made in the following order:

1. Object of Present Embodiments
2. First Embodiment
3. Second Embodiment

1. Object of Present Embodiments

The object of the present Embodiments is described first. A technique in which noise is suppressed from input sound including the noise in order to emphasize target sound has been developed (refer to, for example, Japanese Patent No. 3677143, Japanese Patent No. 4163294, and Japanese Unexamined Patent Application Publication No. 2009-49998). In Japanese Patent No. 3677143, a signal including emphasized target sound (hereinafter referred to as a "sound frequency component") and a signal including the suppressed target sound (hereinafter referred to as a "noise frequency component") are acquired using a plurality of microphones.

It is presumed that the sound frequency component includes target sound and noise and the noise frequency component includes only the noise. Then, spectral subtraction is performed using the sound frequency component and the noise frequency component. In the spectral subtraction process described in Japanese Patent No. 3677143, particular distortion called musical noise may occur in the processed sound signal, which is problematic. In addition, although it is presumed that noise included in the sound frequency component is the same as noise included in the noise frequency component, the two may not be the same in reality.

A widely used spectral subtraction process is described next. In general, in spectral subtraction, a noise component included in a signal is estimated, and subtraction is performed on the power spectrum. Hereinafter, let S denote a target sound component included in a sound frequency component X, let N denote a noise component included in the sound frequency component X, and let N' denote the noise frequency component. Then, the power spectrum of a processed frequency component Y is expressed as follows:

$$|Y|^2=|X|^2-|N'|_2$$

In general, since restoration is made using the phase of an input signal, a noise component can be suppressed by multiplying X by a predetermined value (hereinafter referred to as a "gain value") even when subtraction is used as follows:

$$Y = \sqrt{|X|^2 - |N'|^2} \cdot \frac{X}{|X|} = \sqrt{1 - \frac{|N'|^2}{|X|^2}} \cdot X = Ws(h) \cdot X$$

$$h = \frac{|X|^2}{|N'|^2}$$

Figure 21:
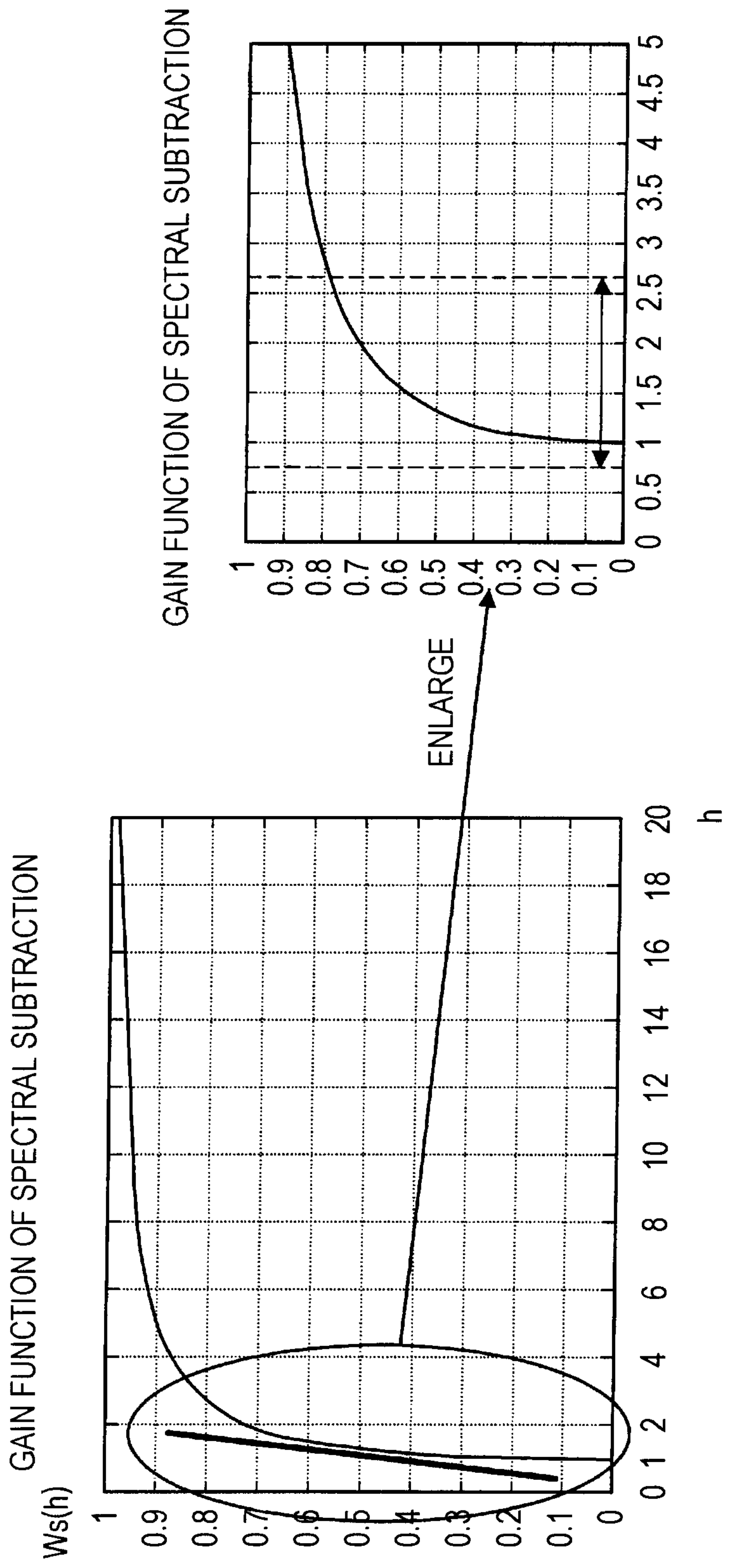
FIG. 21 illustrates a related art.

Since Ws(h) can be considered as a function of the ratio h of X to N', the curve thereof is shown in FIG. 21. The range h<1 is referred to as "flooring". In general, Ws(h) is replaced with an appropriate small value (e.g., Ws(h)=0.05). As shown in FIG. 21, the curve of Ws(h) has a significantly large slope in a range in which h is small.

Accordingly, if h slightly oscillates in the range in which h is small (e.g., 1<h<2), the resultant gain value significantly oscillates. Thus, the frequency component is multiplied by a significantly changing value for each time-frequency representation. In this way, noise called musical noise is generated.

The value h is small when S is significantly small in the sound frequency component X or in a non-sound period for which S=0. In this period, the sound quality is significantly degraded. In addition, it is presumed that N=N'. However, if this presumption is not correct, the gain value significantly oscillates in, in particular, a non-sound period and, therefore, the sound quality is significantly degraded.

In Japanese Unexamined Patent Application Publication No. 2009-49998, the magnitudes of the noise component N and the noise frequency component N' included in the sound frequency component are equalized to the sound frequency component (X=S+N) and the noise frequency component N' in order to perform output adaptation. However, although post filtering means performs MAP optimization, the output adaptation is not sufficiently effective since the technique is based on a Wiener Filter.

In a Wiener Filter, noise is suppressed by multiplying the sound frequency component by the following value for a target sound component S and a noise component N as follows:

$$W = \frac{S^2}{S^2 + N^2},\ Y = W \cdot X$$

In reality, since it is difficult to observe S and N, W is computed using the observable sound frequency component X and the noise frequency component N' as follows:

$$W = \frac{X^2 - N'^2}{X^2} = 1 - \frac{N'^2}{X^2}$$

Figure 22:
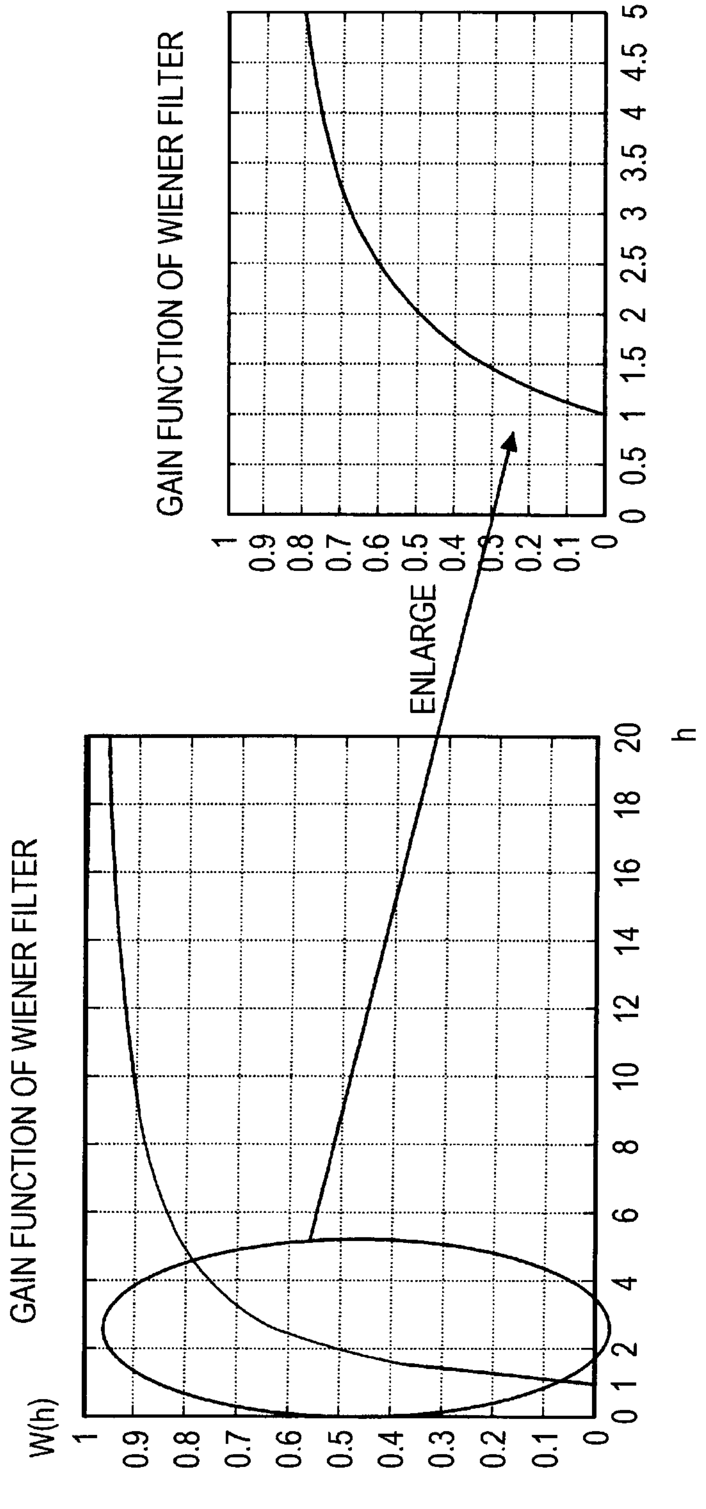
FIG. 22 illustrates a related art.

Like the above-described spectral subtraction, if W is considered as a function of h, the curve thereof is shown in FIG. 22. Like the spectral subtraction shown in FIG. 21, the curve of W(h) has a large slope in a range in which h is small. Due to output adaptation, the variance of h is small (the values of h are concentrated around a value of 1). Thus, as compared with an existing technique, the variation in the gain value to be multiplied can be kept small. However, it is not desirable that the values of h be concentrated at a point at which the slope is large.

Accordingly, to address such an issue, the sound processing apparatus according to the present embodiment is devised. According to the present embodiment, sound emphasis with reduced musical noise can be performed using a certain gain function.

2. First Exemplary Embodiment

A first exemplary embodiment is described next. The outline of the first exemplary embodiment is described with reference to FIGS. 1 and 2. According to the first embodiment, a gain function G(r) used for suppressing noise has the following features:

(1) Provides a minimized value and has a small slope in a range R1 in which r is small (e.g., r<2), (2) Has a large positive slope in a range R2 in which r is a midrange value (e.g., 2<r<6), (3) Has a small slope and converges to 1 in a range R3 in which r is sufficiently large (e.g., r≥6), and (4) Is asymmetrical with respect to an inflection point.

Figure 1:
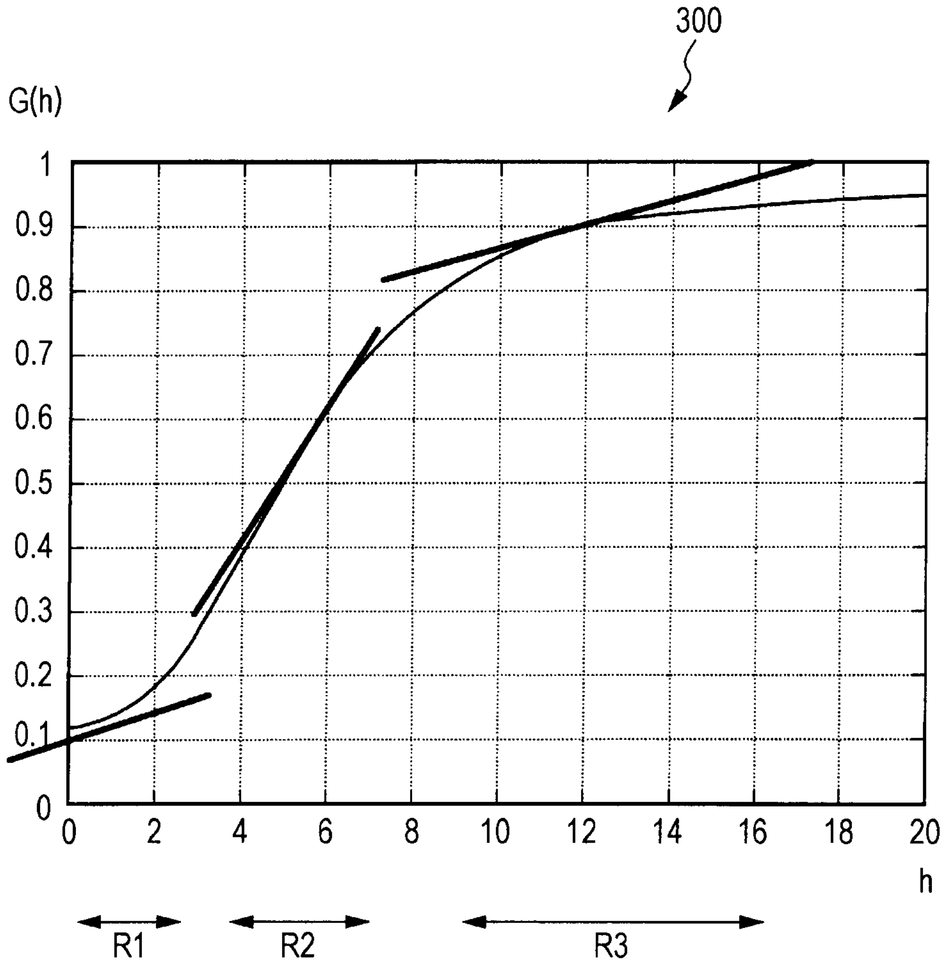
FIG. 1 is a diagram for illustrating the outline of an embodiment of the present invention.
Figure 2:
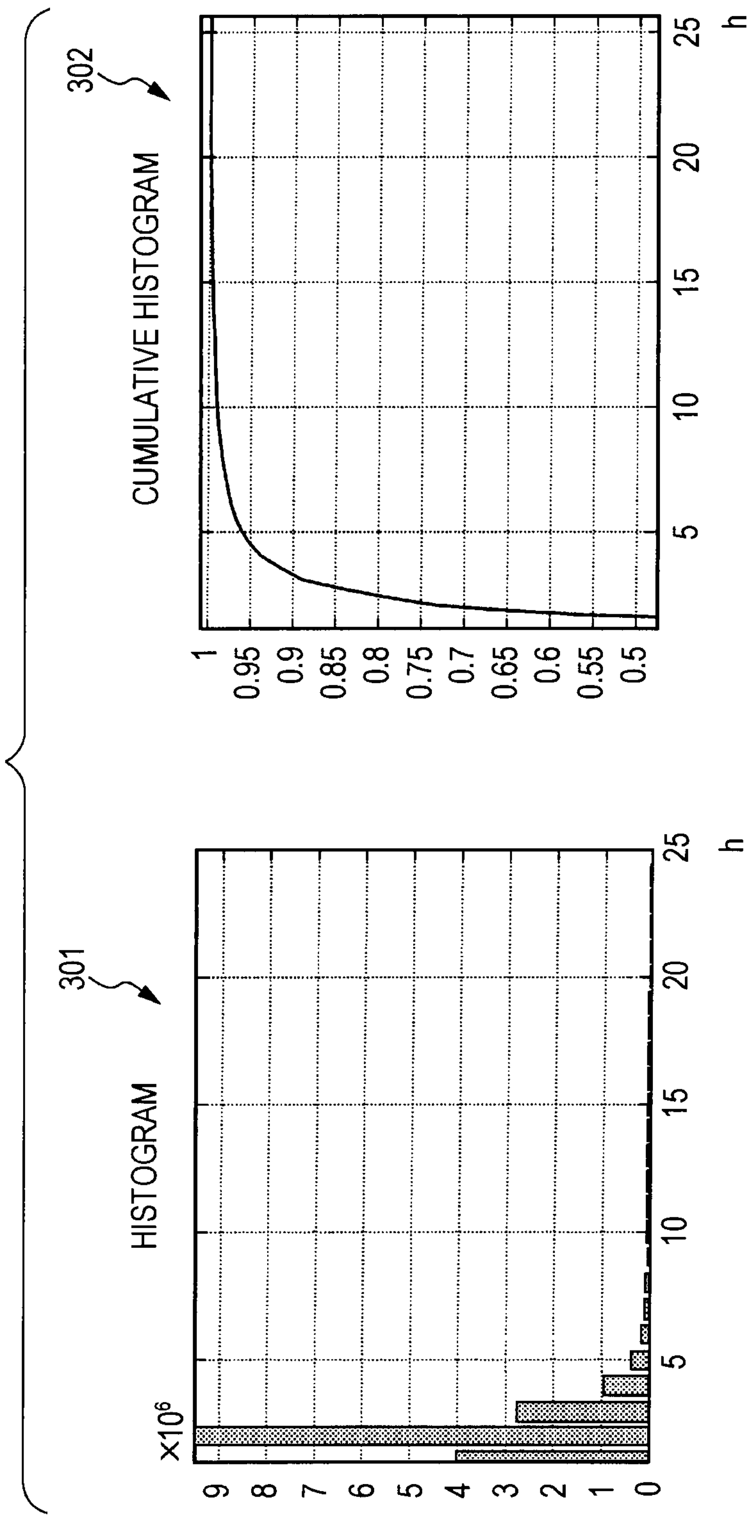
FIG. 2 is a diagram for illustrating the outline of an embodiment of the present invention.

A graph 300 shown in FIG. 1 indicates the curve of the function G(r) that satisfies the above-described conditions (1) to (4). FIG. 2 is a graph of the distribution of the values of h in a period for which only noise is present using actual observation data. As indicated by a histogram 301, in the actual observation data, almost all values (80%) of h in a period for which only noise is present are concentrated at values 0 to 2. Accordingly, the range in which r is small in the above-described condition (1) can be defined as a range in which 80% of data is included when the histogram of a noise-ratio (h) is computed in a period including only noise. In the following description, noise is suppressed using a gain function G(r) that provides a minimized value and that has a small slope in the range R1 in which r<2.

In addition, according to the present embodiment, the power spectrum in the time direction is averaged by detecting a target sound period. For example, by performing long-term averaging of the power spectrum in a period for which target sound is not present, the variance in the time direction can be decreased. Thus, a value having a small variation can be output in the range R1 in which r is small using the above-described gain function. In addition, a value having a small variation in the time direction can be obtained. Thus, the musical noise can be reduced.

Still furthermore, according to the present embodiment, the frequency characteristic is corrected so that the ratio of the noise component N included in the sound frequency component to the noise frequency component N' is within the range R1 of G(r). In this way, h can be further decreased when the gain value is computed and, therefore, the variance can be further decreased. As a result, significant noise suppression and significant musical noise reduction can be realized.

Figure 3:
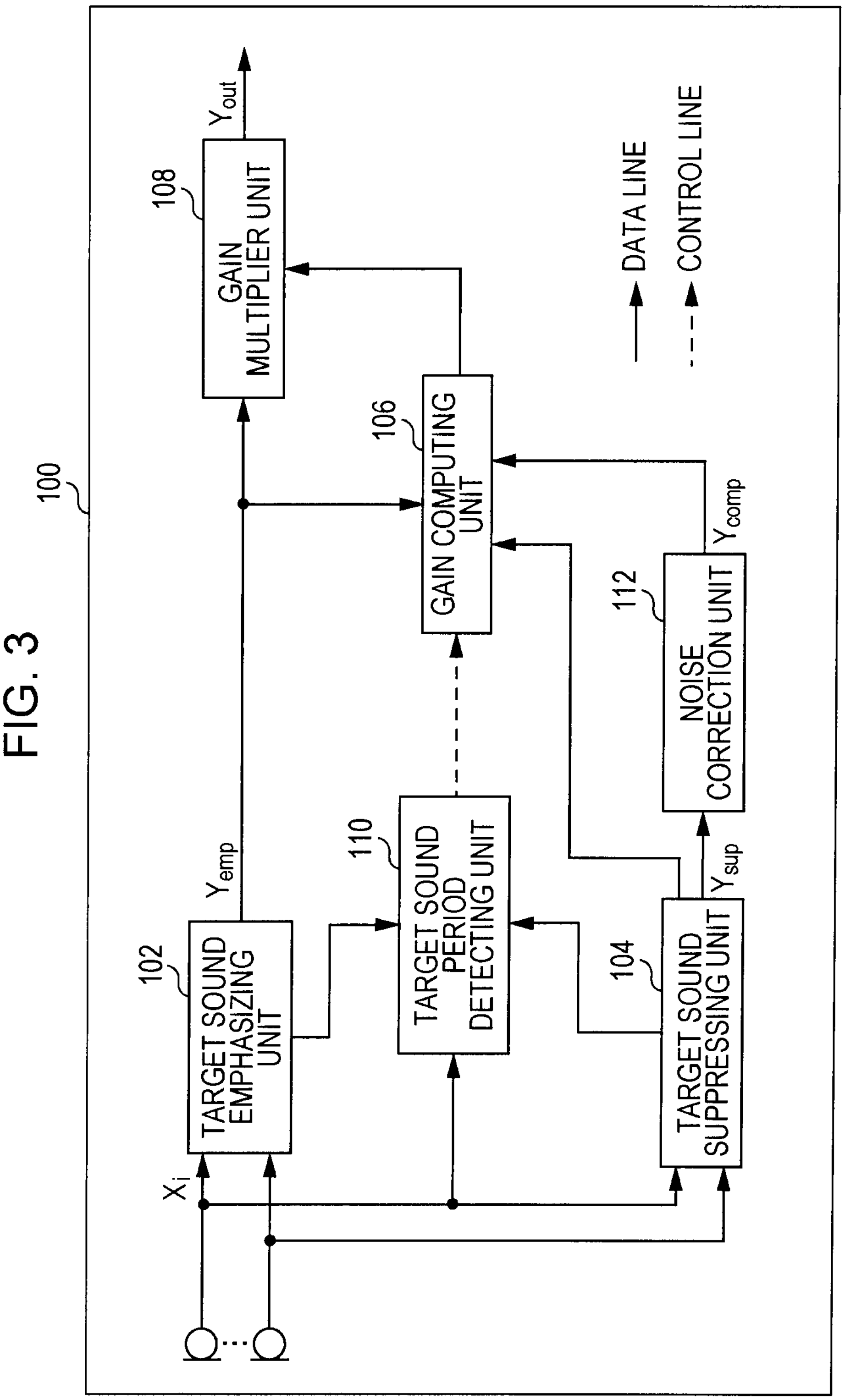
FIG. 3 is a block diagram of an exemplary functional configuration of a sound processing apparatus according to a first embodiment of the present invention.

An exemplary functional configuration of a sound processing apparatus 100 is described next with reference to FIG. 3. FIG. 3 is a block diagram of an exemplary functional configuration of the sound processing apparatus 100. The sound processing apparatus 100 includes a target sound emphasizing unit 102, a target sound suppressing unit 104, a gain computing unit 106, a gain multiplier unit 108, a target sound period detecting unit 110, and a noise correction unit 112.

The target sound emphasizing unit 102 emphasizes target sound included in an input sound including noise. Thus, the target sound emphasizing unit 102 acquires a sound frequency component $Y_{emp}$. According to the present embodiment, while description is made with reference to sound $X_i$ input from a plurality of microphones, the present invention is not limited to such a case. For example, the sound $X_i$ may be input from a single microphone. The sound frequency component $Y_{emp}$ acquired by the target sound emphasizing unit 102 is supplied to the gain computing unit 106, the gain multiplier unit 108, and the target sound period detecting unit 110.

The target sound suppressing unit 104 suppresses the target sound in the input sound in which the target sound and noise are included. Thus, the target sound suppressing unit 104 acquires a noise frequency component $Y_{sup}$. By suppressing the target sound using the target sound suppressing unit 104, a noise component can be estimated. The noise frequency component $Y_{sup}$ acquired by the target sound suppressing unit 104 is supplied to the gain computing unit 106, the target sound period detecting unit 110, and the noise correction unit 112.

The gain computing unit 106 computes a gain value to be multiplied by the sound frequency component using a certain gain function corresponding to the sound frequency component acquired by the target sound emphasizing unit 102 and the noise frequency component acquired by the target sound suppressing unit 104. The term "certain gain function" refers to a gain function providing a gain value and a slope of the gain function that are smaller than predetermined values when an energy ratio of the sound frequency component to the noise frequency component is smaller than or equal to a predetermined value, as shown in FIG. 1.

The gain multiplier unit 108 multiplies the gain value computed by the gain computing unit 106 by the sound frequency component acquired by the target sound emphasizing unit 102. By multiplying the sound frequency component by the gain value provided by the gain function shown in FIG. 1, musical noise can be reduced and, therefore, noise can be suppressed.

The target sound period detecting unit 110 detects a period for which the target sound included in the input sound is present. The target sound period detecting unit 110 computes the amplitude spectrum from the sound frequency component $Y_{emp}$ supplied from the target sound emphasizing unit 102 and the amplitude spectrum from the noise frequency spectrum $Y_{sup}$ acquired from the target sound suppressing unit 104 and obtains a correlation between the amplitude spectrum and the input sound $X_i$ and a correlation between the amplitude spectrum and the input sound $X_i$. In this way, the target sound period detecting unit 110 detects the period of the target sound. A process of detecting the target sound performed by the target sound period detecting unit 110 is described in more detail below.

The gain computing unit 106 averages the power spectrum of the sound frequency component acquired by the target sound emphasizing unit 102 and the power spectrum acquired by the target sound suppressing unit 104 in accordance with the result of detection performed by the target sound period detecting unit 110. The function of the gain computing unit 106 in accordance with the result of detection performed by the target sound period detecting unit 110 is described next with reference to FIG. 4.

Figure 4:
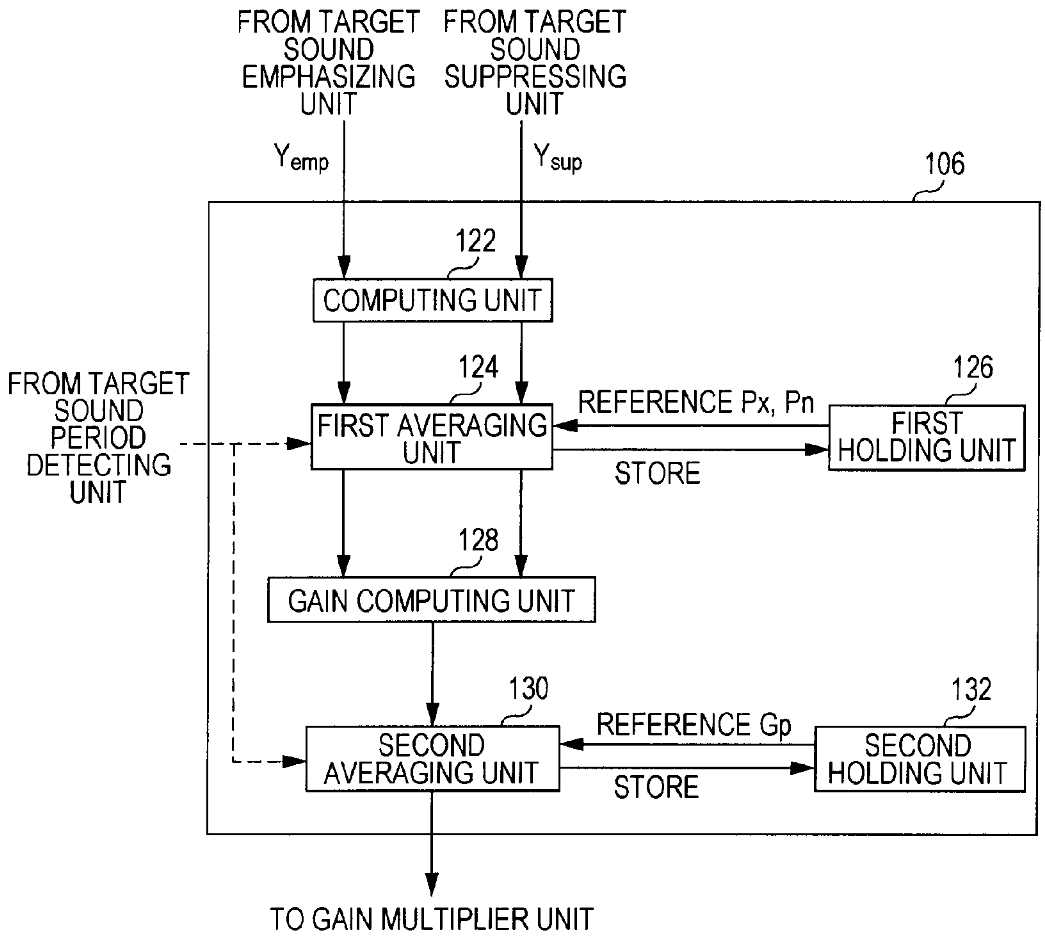
FIG. 4 is a block diagram of an exemplary functional configuration of a gain computing unit according to the first embodiment of the present invention.

As shown in FIG. 4, the gain computing unit 106 includes a computing unit 122, a first averaging unit 124, a first holding unit 126, a gain computing unit 128, a second averaging unit 130, and a second holding unit 132. The computing unit 122 computes the power spectrum for each of the sound frequency component $Y_{emp}$ acquired by the target sound emphasizing unit 102 and the frequency spectrum $Y_{sup}$ acquired by the target sound suppressing unit 104.

Thereafter, the first averaging unit 124 averages the power spectrum in accordance with a control signal indicating the target sound period detected by the target sound period detecting unit 110. For example, the first averaging unit 124 averages the power spectrum in accordance with the result of detection performed by the target sound period detecting unit 110 using the first-order attenuation. In a period for which the target sound is present, the first averaging unit 124 averages the power spectrum using the following expression:

$$Px = r_1 \cdot Px + (1 - r_1) \cdot Y_{emp}^2$$

$$Pn = r_3 \cdot Pn + (1 - r_3) \cdot Y_{sup}^2$$

However, in a period for which the target sound is not present, the first averaging unit 124 averages the power spectrum using the following expression:

$$Px = r_2 \cdot Px + (1 - r_2) \cdot Y_{emp}^2$$

$$Pn = r_3 \cdot Pn + (1 - r_3) \cdot Y_{sup}^2$$

$$0 \le r_1 \le r_2 \le 1$$

For example, in the above-described expressions, $r_1=0.3$ and $r_2=0.9$ are used when $r_1<r_2$. In addition, for example, it is desirable that $r_3$ be a value close to $r_2$. Instead of using $r_1$ and $r_2$ of discrete values in accordance with the presence of the target sound, $r_1$ and $r_2$ may be continuously changed. A technique for continuously changing $r_1$ and $r_2$ is described in more detail below. In addition, while the above-description has been made with reference to smoothing using the first-order attenuation, the present embodiment is not limited to such an operation. For example, N frames may be averaged, and, like r, the number N may be controlled. That is, if the target sound is present, control may be performed using the average of the past three frames. However, if the target sound is not present, control may be performed using the average of the past seven frames.

In the above description, by performing long-term averaging of Px and Pn in a period for which a target sound is not present, the variance in the time direction can be decreased. As shown in FIG. 1, by using the gain function according to the present embodiment, a value having a small variation can be output in the range in which r is small (R1). That is, by using the gain function G(r), the occurrence of musical noise can be reduced even in the range in which r is small. In addition, by averaging the power spectrum, the value having a small variation in the time direction can be obtained. In this way, the musical noise can be further reduced. However, if long-term averaging is performed in a period for which a target sound is present, an echo is sensed by a user. Accordingly, the smoothing coefficient r is controlled in accordance with the presence of the target sound.

The gain computing unit 128 computes the value providing the curve shown in FIG. 1 in accordance with h=Px/Pn. At that time, the values in a prestored table may be used. Alternatively, the following function having the curve shown in FIG. 1 may be used:

$$G(h) = b \cdot e^{-c \cdot h}$$

For example, b=0.8, and C=0.4.

Figure 5:
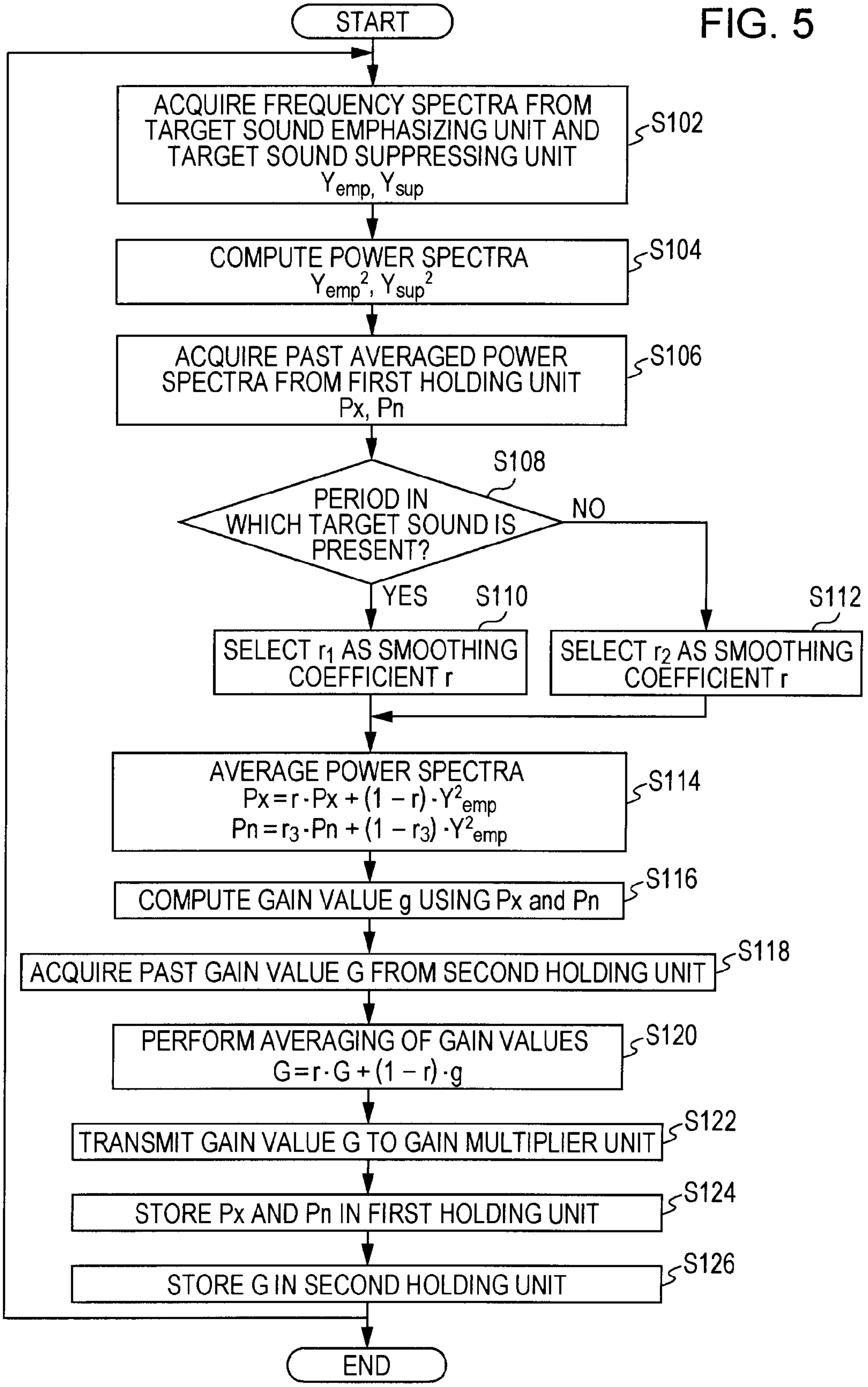
FIG. 5 is a flowchart of an averaging process performed by the gain computing unit according to the first embodiment of the present invention.

The second averaging unit 130 performs a gain value averaging process the same as that performed by the first averaging unit 124. The averaging coefficients may be values that are the same as $r_1$, $r_2$, and $r_3$. Alternatively, the averaging coefficients may be values different from $r_1$, $r_2$, and $r_3$. The averaging process performed by the gain computing unit 106 is described next with reference to FIG. 5. FIG. 5 is a flowchart of the averaging process performed by the gain computing unit 106.

As shown in FIG. 5, the gain computing unit 106 acquires the frequency spectra ($Y_{emp}$, $Y_{sup}$) from the target sound emphasizing unit 102 and the target sound suppressing unit 104 (step S102). Thereafter, the gain computing unit 106 computes the power spectra ($Y_{emp}^2$, $Y_{sup}^2$) (step S104). Subsequently, the gain computing unit 106 acquires past averaged power spectra (Px, Pn) from the first holding unit 126 (step S106). The gain computing unit 106 determines whether the period is a period for which a target sound is present (step S108).

If, in step S108, it is determined that the period is a period for which a target sound is present, the gain computing unit 106 selects a smoothing coefficient so that $r=r_1$ (step S110). However, if in step S108, it is determined that the period is a period for which a target sound is not present, the gain computing unit 106 selects a smoothing coefficient so that $r=r_2$. Thereafter, the gain computing unit 106 performs averaging of the power spectrum using the following equation (step S114):

$$Px=r\cdot Px+(1-r)\cdot Y_{emp}^2$$

$$Pn=r_3\cdot Pn+(1-r_3)\cdot Y_{sup}^2$$

Subsequently, the gain computing unit 106 computes a gain value g using Px and Pn (step S116). Thereafter, the gain computing unit 106 acquires the past gain value G from the second holding unit 132 (step S118). The gain computing unit 106 performs averaging of the gain value G acquired in step S118 using the following equation:

$$G=r\cdot G+(1-r)\cdot g$$

In step S120, the gain computing unit 106 transmits the averaged gain value G to the gain multiplier unit 108 (step S122). Thereafter, the gain computing unit 106 stores Px and Pn in the first holding unit 126 (step S124) and stores the gain value G in the second holding unit 132 (step S126). This process is performed for all of the frequency ranges. In addition, while the above process has been described with reference to the same averaging coefficient used for averaging of the power spectrum and averaging of the gain, the present embodiment is not limited thereto. Different averaging coefficients may be used for averaging of the power spectrum and averaging of the gain.

Figure 6:
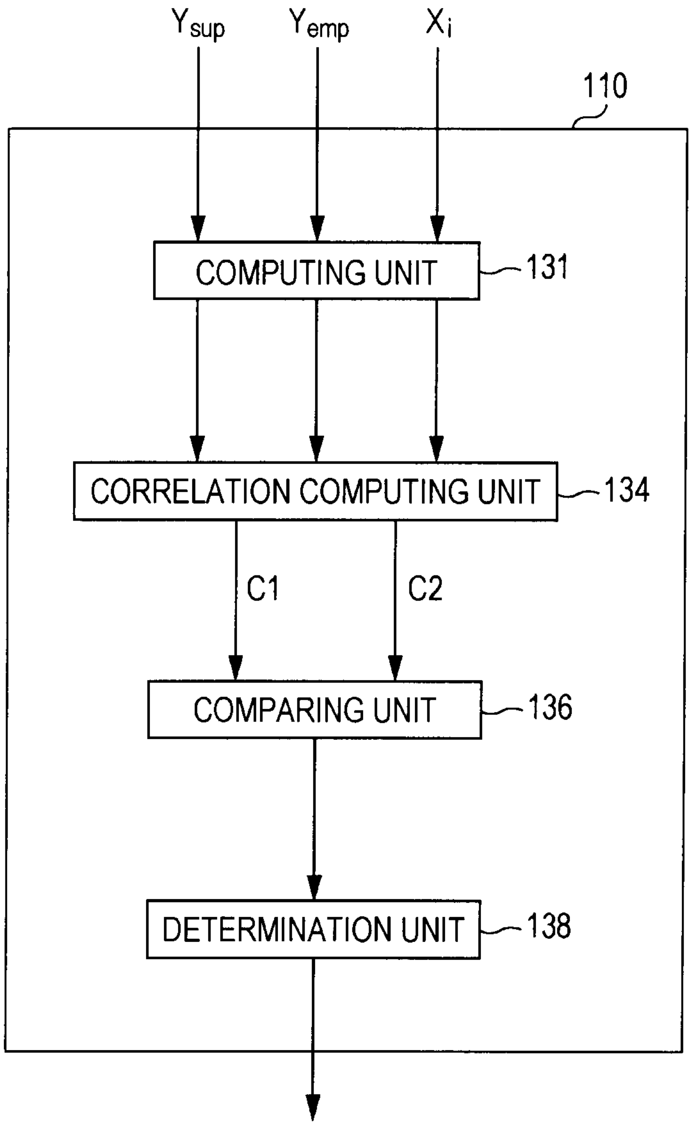
FIG. 6 is a block diagram of an exemplary functional configuration of a target sound period detecting unit according to the first embodiment of the present invention.

The process of detecting target sound performed by the target sound period detecting unit 110 is described next with reference to FIG. 6. As shown in FIG. 6, the target sound period detecting unit 110 includes a computing unit 131, a correlation computing unit 134, a comparing unit 136, and a determination unit 138.

The computing unit 131 receives the sound frequency component $Y_{emp}$ supplied from the target sound emphasizing unit 102, the frequency spectrum $Y_{sup}$ supplied from the target sound suppressing unit 104, and one of the frequency spectra $X_i$ of the input signal. In order to select one of the frequency spectra $X_i$, any one of the microphones can be selected. However, if the position from which the target sound is input is predetermined, it is desirable that a microphone set at a position closest to the position be used. In this way, the target sound can be input at the highest level.

The computing unit 131 computes the amplitude spectrum or the power spectrum of each of the input frequency spectra. Thereafter, the correlation computing unit 134 computes a correlation C1 between the amplitude spectrum of $Y_{emp}$ and the amplitude spectrum of $X_i$ and a correlation C2 between the amplitude spectrum of $Y_{sup}$ and the amplitude spectrum of X. The comparing unit 136 compares the correlation C1 with the correlation C2 computed by the correlation computing unit 134. The determination unit 138 determines whether the target sound is preset or not in accordance with the result of comparison performed by the comparing unit 136.

The determination unit 138 determines whether the target sound is present using the correlation between the amplitude spectra and the following technique. The following components are included in the signal input to the computing unit 131: the sound frequency component $Y_{emp}$ acquired from the target sound emphasizing unit 102 (the sum of the target sound and the suppressed noise component), the frequency spectrum $Y_{sup}$ acquired from the target sound suppressing unit 104 (the noise component), and one of the frequency spectra $X_i$ of the input signal (the sum of the target sound and the suppressed noise component).

Figure 7:
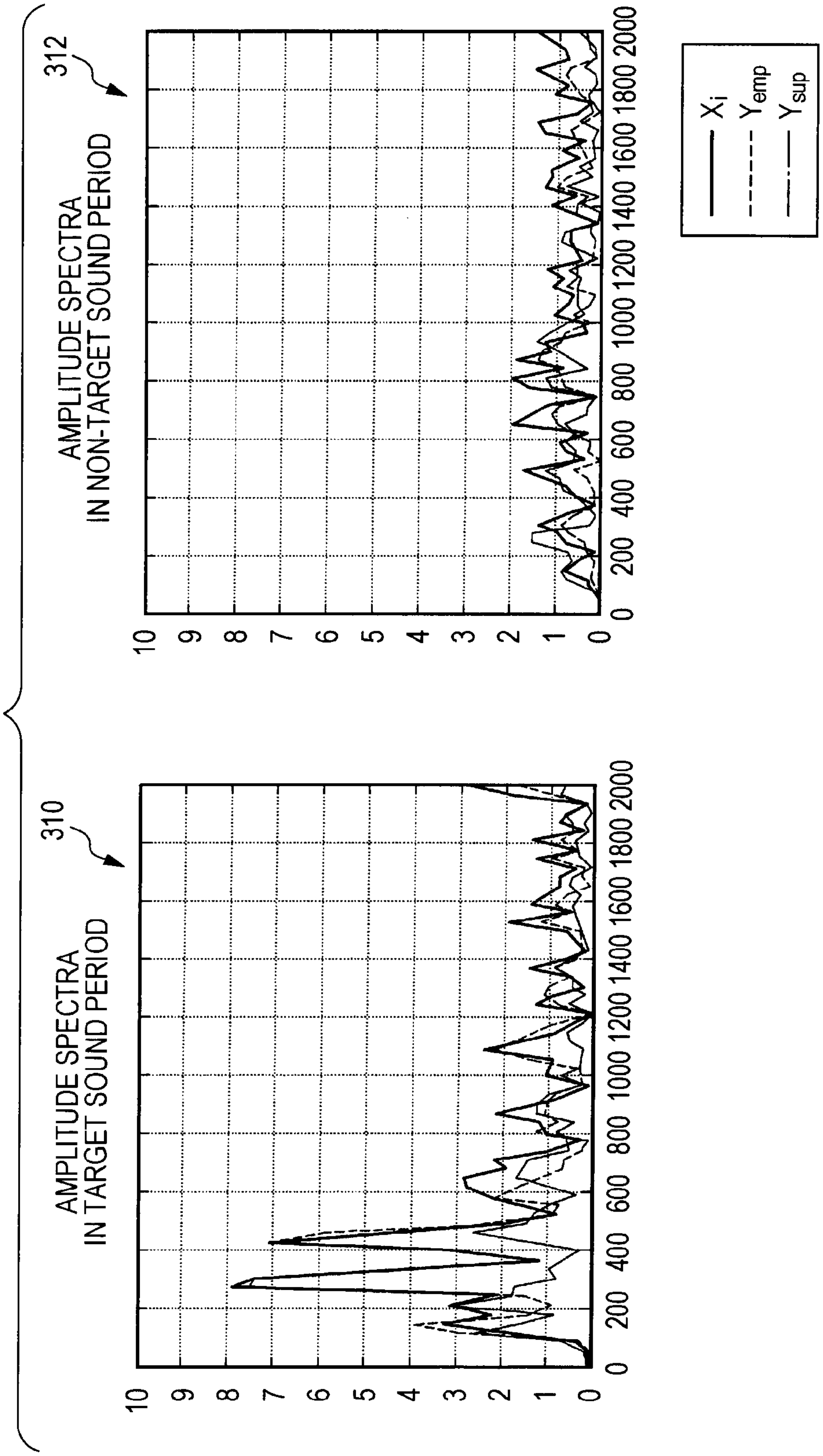
FIG. 7 is a diagram illustrating a process for detecting target sound according to the first embodiment of the present invention.

The correlation between the amplitude spectra exhibits a large value when the two spectra are similar. As indicated by a graph 310 shown in FIG. 7, in a period for which the target sound is present, the shape of spectrum $X_i$ is more similar to $Y_{emp}$ than $Y_{sup}$. In addition, as indicated by a graph 312 shown in FIG. 7, in a period for which the target sound is not present, only noise is present. Therefore, $Y_{sup}$ is similar to $Y_{emp}$, and the shape of $X_i$ is similar to $Y_{sup}$ and $Y_{emp}$.

Figure 8:
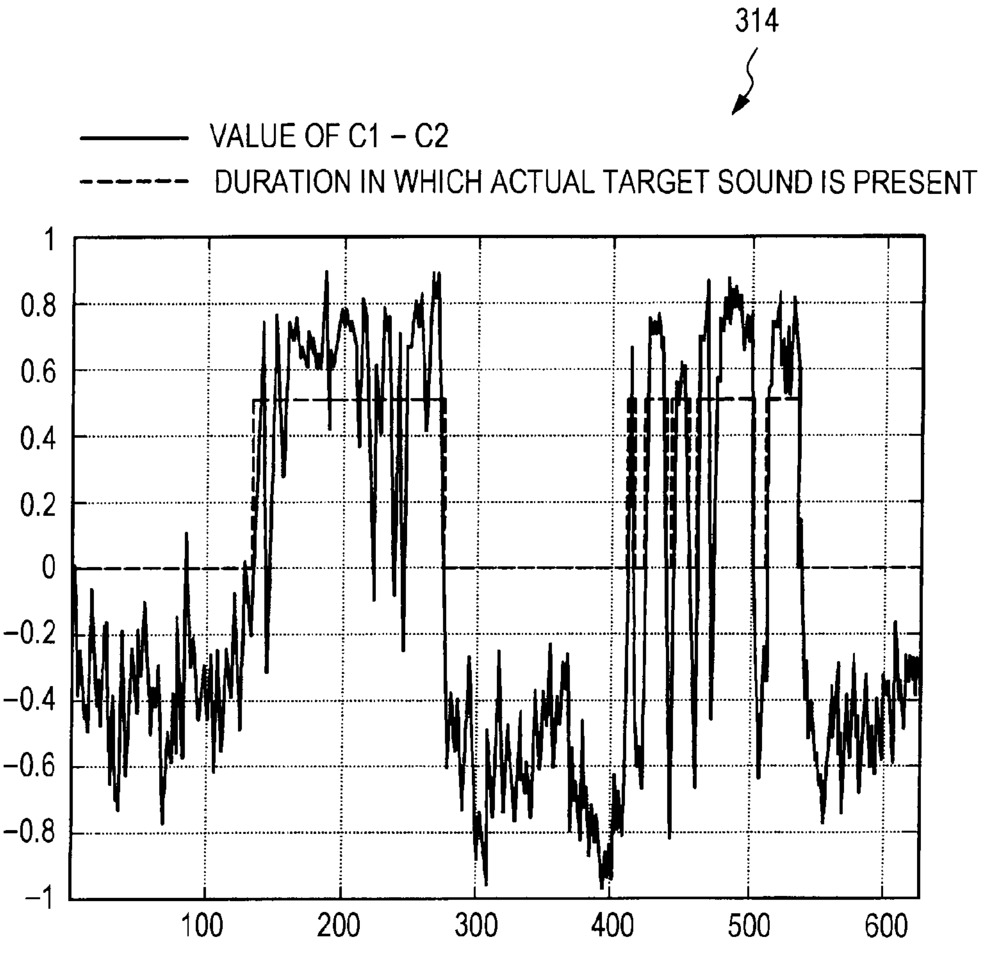
FIG. 8 is a diagram illustrating a process for detecting target sound according to the first embodiment of the present invention.

Accordingly, the correlation value C1 between $X_i$ and $Y_{emp}$ is larger than the correlation value C2 between $X_i$ and $Y_{sup}$ in a period for which the target sound is present. In contrast, in a period for which the target sound is not present, C1 is substantially the same as C2. As indicated by a graph 314 shown in FIG. 8, the value obtained by subtracting the correlation value C2 from the correlation value C1 is substantially the same as the value indicating the period for which the actual target sound is present. By comparing the correlations between the spectra in this manner, a period for which the target sound is present can be differentiated from a period for which the target sound is not present.

Figure 9:
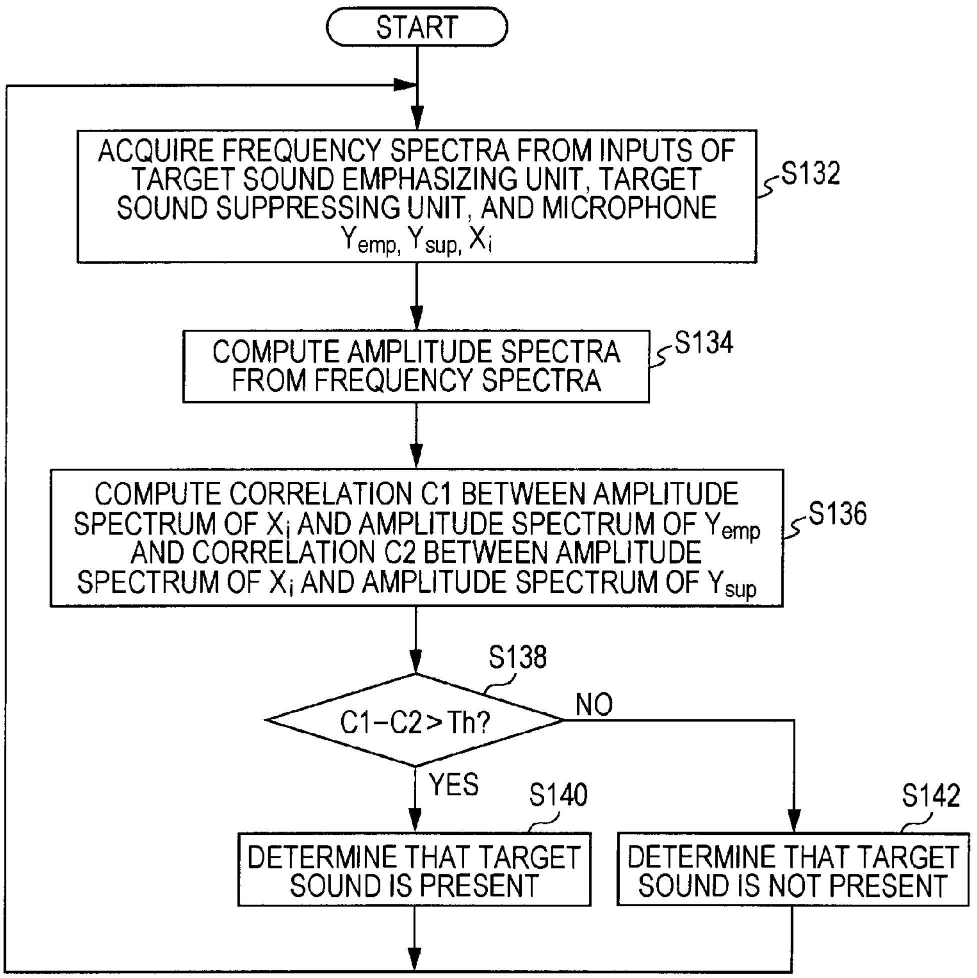
FIG. 9 is a flowchart of a process for detecting the target sound period according to the first embodiment of the present invention.

The process of detecting a target sound period performed by the target sound period detecting unit 110 is described next with reference to FIG. 9. FIG. 9 is a flowchart of the process of detecting a target sound period performed by the target sound period detecting unit 110. As shown in FIG. 9, the sound frequency component $Y_{emp}$ is acquired from the target sound emphasizing unit 102, the frequency spectrum $Y_{sup}$ is acquired from the target sound suppressing unit 104, and the frequency spectrum $X_i$ is acquired from the input of the microphone (step S132).

The amplitude spectrum is computed using the frequency spectrum acquired in step S132 (step S134). Thereafter, the target sound period detecting unit 110 computes the correlation C1 between the amplitude spectra of $X_i$ and $Y_{emp}$ and the correlation C2 between the amplitude spectra of $X_i$ and $Y_{sup}$ (step S136). Subsequently, the target sound period detecting unit 110 determines whether a value obtained by subtracting the correlation C2 from the correlation C1 (i.e., C1−C2) is greater than a threshold value Th of $X_i$ (step S138).

If, in step S138, it is determined that (C1−C2) is greater than Th, the target sound period detecting unit 110 determines that the target sound is present (step S140). However, if, in step S138, it is determined that (C1−C2) is less than Th, the target sound period detecting unit 110 determines that the target sound is not present (step S142). As described above, the process of detecting a target sound period is performed by the target sound period detecting unit 110.

The process of detecting a target sound period performed by the target sound period detecting unit 110 using mathematical expressions is described next. First, the amplitude spectra are defined as follows:

$A_{xi}(n, k)$=amplitude spectrum of frame n of $X_i$ in frequency bin k, $A_{emp}(n, k)$=amplitude spectrum of frame n of $Y_{emp}$ in frequency bin k, and $A_{sup}(n, k)$=amplitude spectrum of frame n of $Y_{sup}$ in frequency bin k.

A whitening process is performed using the average value of $Ax_i$ as follows:

$$Aw_{x_i w}(n,k) = A_{x_i}(n,k) - \frac{1}{2L+1}\sum_{i=k-L}^{k+L} A_{x_i}(n,i)$$

$$Aw_{emp}(n,k) = A_{emp}(n,k) - \frac{1}{2L+1}\sum_{i=k-L}^{k+L} A_{x_i}(n,i)$$

$$Aw_{sup}(n,k) = A_{sup}(n,k) - \frac{1}{2L+1}\sum_{i=k-L}^{k+L} A_{x_i}(n,i)$$

Let p(k) be the weight for each of the frequencies. Then, a correlation between $Aw_{emp}(n, k)$ and $AWx_1$ is computed as follows:

$$C_1(n) = \frac{\sum_{k=0}^{N/2} (p(k)\cdot Aw_{emp}(n,k)\cdot p(k)\cdot Aw_{x_i}(n,k))}{\sqrt{\sum_{k=0}^{N/2} (p(k)\cdot Aw_{emp}(n,k))^2}\cdot\sqrt{\sum_{k=0}^{N/2} (p(k)\cdot Aw_{x_i}(n,k))^2}}$$

Figure 10:
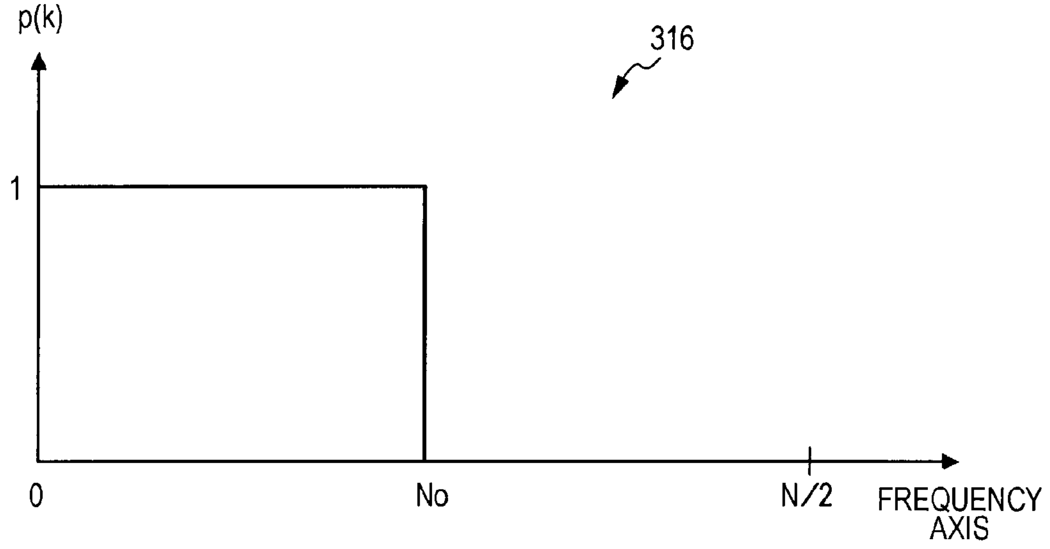
FIG. 10 is a diagram illustrating a process for detecting target sound according to the first embodiment of the present invention.

For example, the weight p(k) is represented as a function 316 shown in FIG. 10. In sound, high energy is mainly concentrated in a low frequency range. In contrast, in noise, the energy is present over a wide range of frequencies. Accordingly, by using a frequency range in which the sound is strong, the accuracy can be increased. For example, No=40 and L=3 are used for N=512 (the FFT size).

Figure 11:
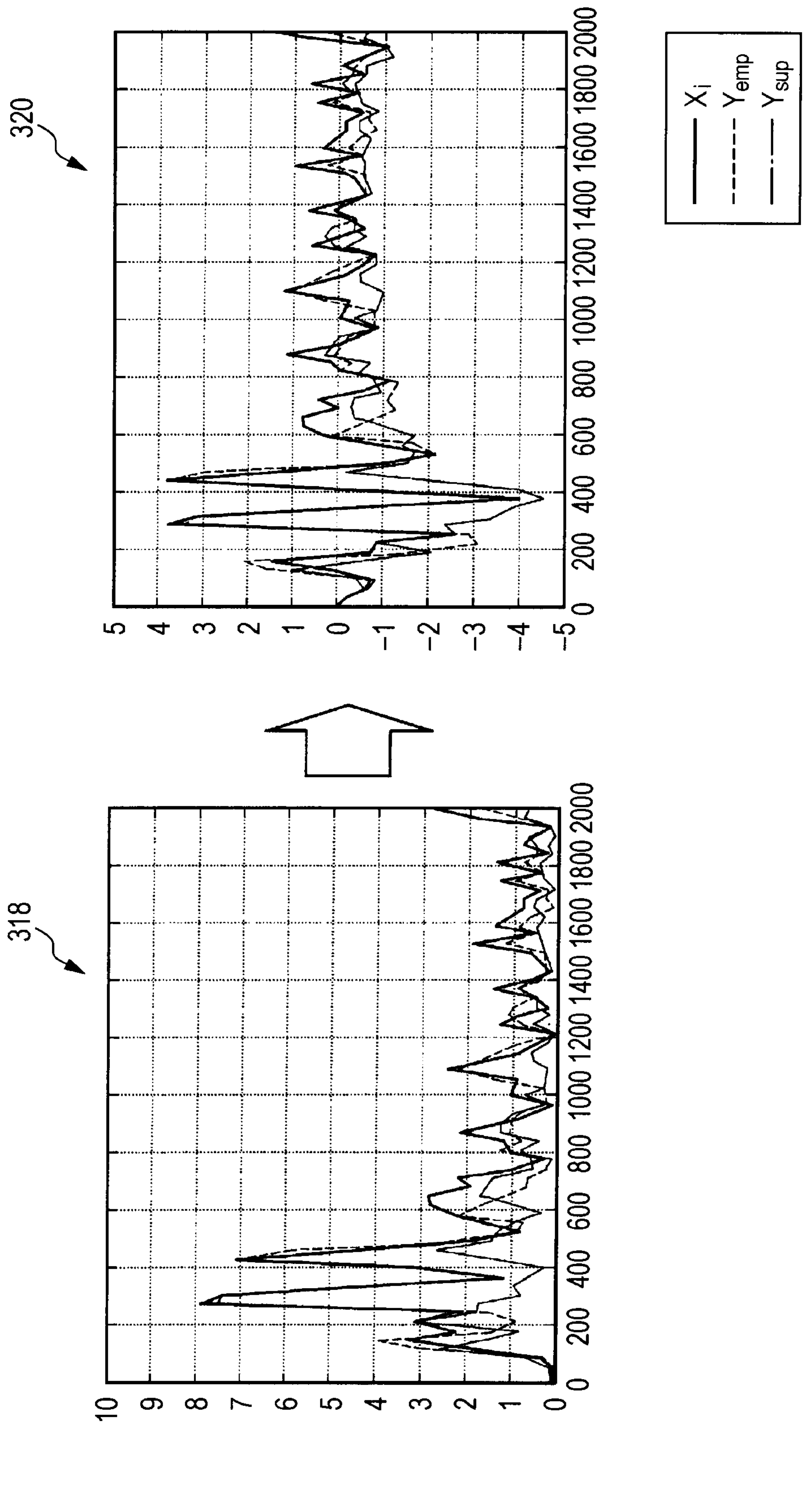
FIG. 11 is a diagram illustrating a whitening process according to the first embodiment of the present invention.

The above-mentioned whitening process is described in more detail next with reference to FIG. 11. As indicated by a graph 318 shown in FIG. 11, the amplitude spectrum exhibits only positive values. Therefore, the correlation value also exhibits only positive values. Consequently, the range of the value is small. In practice, the correlation value ranges between about 0.6 to about 1.0. Accordingly, by subtracting a reference DC component, the amplitude spectrum can be made to be positive or negative. As used herein, such an operation is referred to as "whitening". By performing whitening in this manner, the correlation value can also range between −1 and 1. In this way, the accuracy of detecting the target sound can be increased.

In the above description, the smoothing coefficients $r_1$ and $r_2$ can be continuously changed. Thus, the case in which the smoothing coefficients $r_1$ and $r_2$ are continuously changed is described next. In the following description, $C_1$, $C_2$, and the threshold value Th computed by the target sound period detecting unit 110 are used. A value less than or equal to 1 is obtained by using these values and the following equation:

$$v=\min(||C_1-C_2|-Th|^{\beta},1).$$

where for example, β=1 or 2, and min represents a function that selects the smaller value from two values of t.

In the above-described equation, v is close to 1 when the target sound is present. Using this feature, the smoothing coefficient can be continuously obtained as follows:

$$r=v\cdot r_1+(1-v)\cdot r_2$$

$$Px=r\cdot Px+(1-r)\cdot Y_{emp}^{2}$$

At that time, control is performed so that $r\approx r_1$ if the target sound is present and, otherwise, $r\approx r_2$.

Referring back to FIG. 3, the functional configuration of the sound processing apparatus 100 is continuously described. The noise correction unit 112 can correct the noise frequency component so that the magnitude of the noise frequency component acquired by the target sound suppressing unit 104 corresponds to the magnitude of the noise component included in the sound frequency component acquired by the target sound emphasizing unit 102. In this way, when the gain value is computed by the gain computing unit 106, h can be decreased and, thus, the variance can be further decreased. As a result, the noise can be significantly suppressed, and the musical noise can be significantly reduced.

The idea for correcting noise performed by the noise correction unit 112 is described first. The following process is performed for each of the frequency components. However, for simplicity, description is made without using a frequency index.

Let S denote the spectrum of a sound source, let A denote the transfer characteristic from the target sound source to a microphone, and let N denote a noise component observed by the microphone. Then, a sound frequency component X observed by the microphone can be expressed as follows:

$$X=A\cdot S+N\ N=(X_i,X_2,\ldots,X_M)$$

$$A=(a_1,a_2,\ldots,a_m)^T$$

$$N=(N_1,N_2,\ldots,N_M)$$

where M demotes the number of microphones.

Each of the target sound emphasizing unit 102 and the target sound suppressing unit 104 performs a process in which X is multiplied by a certain weight and the sum is computed. Accordingly, the output signals of the target sound emphasizing unit 102 and the target sound suppressing unit 104 can be expressed as follows:

$$Y_{emp}=W_{emp}^{H}\cdot X=S+W_{emp}^{H}\cdot N$$

$$Y_{sup}=W_{sup}H\cdot X=W_{sup}^{H}\cdot N$$

By changing the weights multiplied by X, the target sound can be decreased or increased.

Accordingly, the noise component included in the output of the target sound emphasizing unit 102 differs from the output of the target sound suppressing unit 104 unless $W_{emp}$ is the same as $W_{sup}$. More specifically, since noise is suppressed in the power spectrum, the levels of noise for the individual frequencies are not the same. Therefore, by correcting $W_{emp}$ and $W_{sup}$, h used when the gain value is computed can be made close to 1. That is, the gain value can be concentrated at small values and at a point at which the slope of the gain function is small. h can be expressed as follows:

$$h = \frac{|W_{emp}^{H}\cdot N|^2}{|W_{sup}^{H}\cdot N|^2}$$

For example, in the case of $$|W_{emp}^{H}\cdot N|^2>|W_{sup}^{H}\cdot N|^2,$$

h can be made to approach 1 from a value greater than 1 by performing the correction. Thus, the noise suppression amount can be improved.

Alternatively, in the case of $$|W_{emp}^{H}\cdot N|^2<|W_{sup}^{H}\cdot N|^2,$$

h can be made to approach 1 from a value less than 1 by performing the correction. Thus, the degradation of sound can be made small.

If h is concentrated at small values around 1, the minimum value of the gain function can be made small. In this way, the noise suppression amount can be improved. $W_{emp}$ and $W_{sup}$ are known values. Therefore, if a covariance Rn of the noise component N is obtained, noise can be corrected using the following equations:

$$Gcomp = \frac{W_{emp}^H \cdot R_n \cdot W_{emp}}{W_{sup}^H \cdot R_n \cdot W_{sup}}$$

$$Y_{comp} = \sqrt{Gcomp} \cdot Y_{sup}$$

Figure 12:
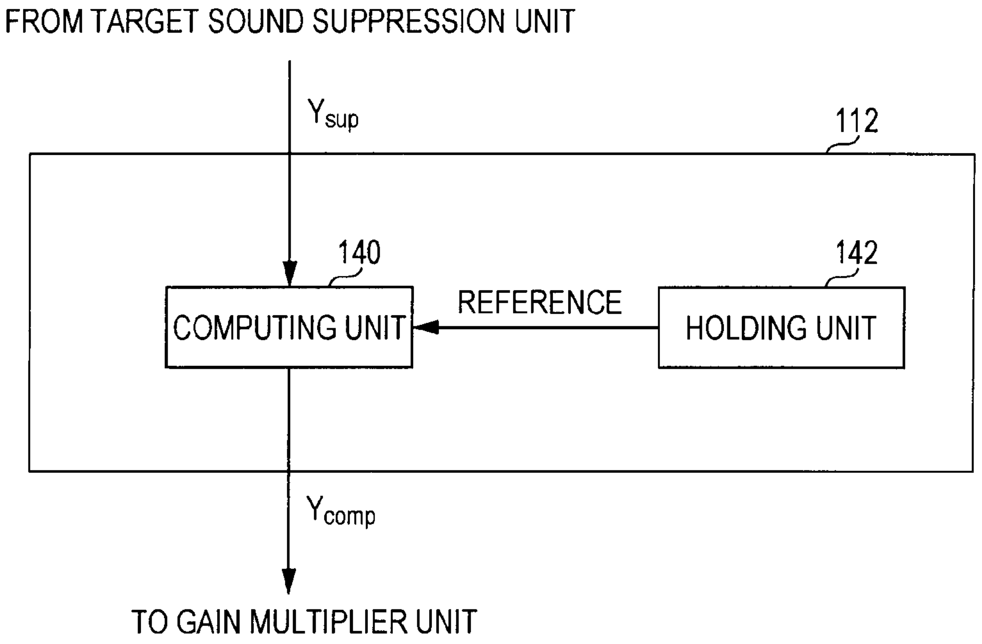
FIG. 12 is a block diagram of an exemplary functional configuration of a noise correction unit according to the first embodiment of the present invention.

The noise correction process performed by the noise correction unit 112 is described next with reference to FIG. 12. As shown in FIG. 12, the noise correction unit 112 includes a computing unit 140 and a holding unit 142. The computing unit 140 receives the frequency spectrum $Y_{sup}$ acquired by the target sound suppressing unit 104. Thereafter, the computing unit 140 references the holding unit 142 and computes a correction coefficient. The computing unit 140 multiplies the input frequency spectrum $Y_{sup}$ by the correction coefficient. Thus, the computing unit 140 computes a noise spectrum Ycomp. The computed noise spectrum Ycomp is supplied to the gain computing unit 106. The holding unit 142 stores the covariance of the noise and coefficients used in the target sound emphasizing unit 102 and the target sound suppressing unit 104.

Figure 13:
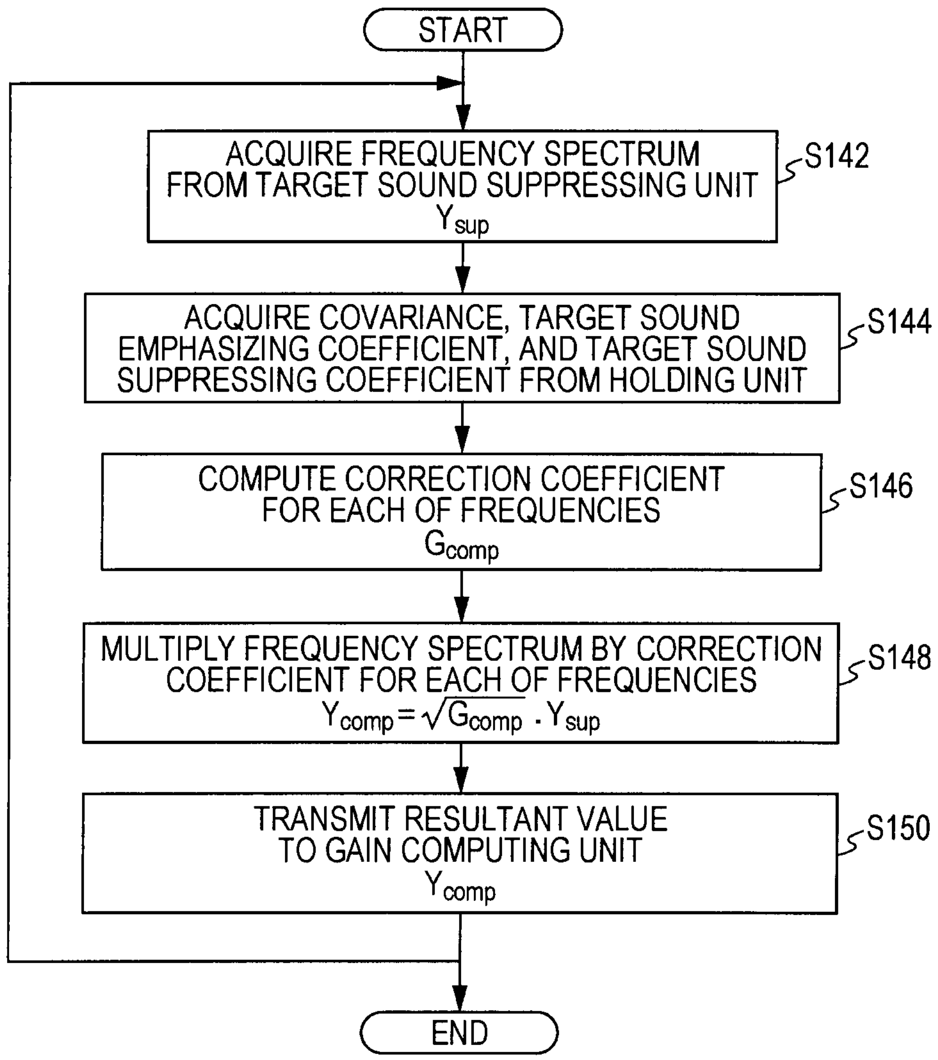
FIG. 13 is a flowchart of a noise correction process according to the first embodiment of the present invention.

The noise correction process performed by the noise correction unit 112 is described next with reference to FIG. 13. FIG. 13 is a flowchart of the noise correction process performed by the noise correction unit 112. As shown in FIG. 13, the noise correction unit 112 acquires the frequency spectrum $Y_{sup}$ from the target sound suppressing unit 104 first (step S142). Thereafter, the noise correction unit 112 acquires the covariance, the coefficient for emphasizing the target sound, and the coefficient for suppressing the target sound from the holding unit 142 (step S144). Subsequently, a correction coefficient Gcomp is computed for each of the frequencies (step S146).

Subsequently, the noise correction unit 112 multiplies the frequency spectrum by the correction coefficient Gcomp computed in step S146 for each of the frequencies (step S148) as follows:

$$Y_{comp} = \sqrt{G_{comp}} \cdot Y_{sup}$$

Subsequently, the noise correction unit 112 transmits the resultant value Ycomp computed in step S148 to the gain computing unit 106 (step S150). The above-described process is repeatedly performed by the noise correction unit 112 for each of the frequencies.

For example, the above-described covariance Rn of the noise can be computed using the following equation (refer to "Measurement of Correlation Coefficients in Reverberant Sound Fields", Richard K. Cook et. al, THE JOURNAL OF THE ACOUSTICAL SOCIETY OF AMERICA, VOLUME 26, NUMBER 6, November 1955):

$$R_n(\omega) = \begin{pmatrix} r_{11}(\omega) & \dots & r_{1M}(\omega) \\ \vdots & \dots & \vdots \\ r_{M1}(\omega) & \dots & r_{MM}(\omega) \end{pmatrix}$$

When diffuse noise field is set for microphones arranged in a line, $$r_{ij}(\omega) = \frac{\sin(\omega \cdot d_{ij}/c)}{\omega \cdot d_{ij}/c}$$

$d_{ij}$=distance between microphones i and j
c=acoustic velocity
ω=each of the frequencies
i=1, . . . , M, and j=1, . . . , M Suppose that uncorrelated noise is coming from all directions to the microphones arranged in a line. Then, $$\gamma_{ij}(\omega) = J_0(\omega \cdot d_{ij}/c)$$

$J_0$=the 0th-order Bessel function

Instead of computing the covariance Rn of the noise using mathematical expressions, the covariance Rn of the noise can be obtained by collecting a large number of data items in advance and computing the average value of the data items. In such a case, only noise is observed by the microphones. Accordingly, the covariance of the noise can be computed using the following equations:

$$X(\omega) = N(\omega)$$

$$r_{ij}(\omega) = E[X_i(\omega) \cdot X_j(\omega)^*]$$

where X* denote a complex conjugate number.

In addition, the following coefficient can be generated using the target sound emphasizing unit 102, the above-described transfer characteristic A, and the covariance Rn (in general, this technique is referred to as "maximum-likelihood beam forming" (refer to "Adaptive Antenna Technology" (in Japanese), Nobuyoshi KIKUMA, Ohmsha)):

$$W_{em} = \frac{R_n^{-1} \cdot A}{A^H \cdot R_n^{-1} \cdot A}$$

Note that the technique is not limited to maximum-likelihood beam forming. For example, a technique called delayed sum beam forming may be used. The delayed sum beam forming is equivalent to the maximum-likelihood beam forming technique if Rn represents a unit matrix. In addition, in the target sound suppressing unit 104, the following coefficient is generated using the above-described A and a transfer characteristic other than A:

$$\begin{pmatrix} A^* \\ B^* \end{pmatrix} \cdot W_{sup} = \begin{pmatrix} 0 \\ 1 \end{pmatrix}$$

The coefficient makes a signal "1" for a direction different from the direction of the target sound and makes the signal "0" for the direction of the target sound.

Figure 14:
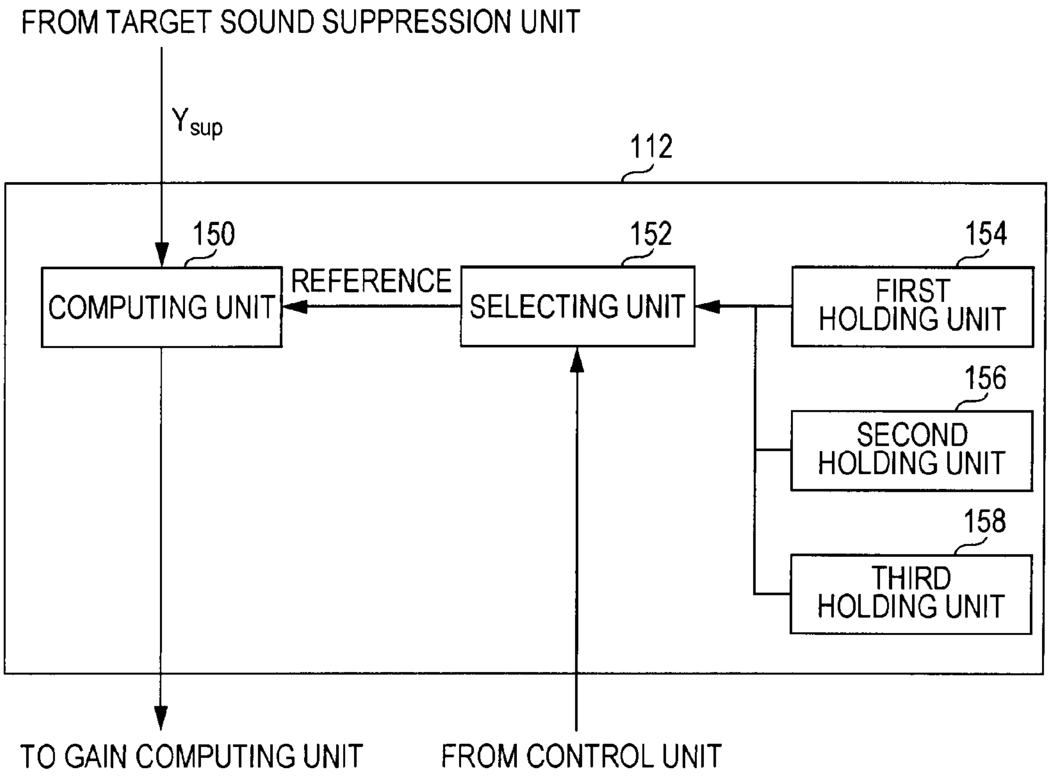
FIG. 14 is a block diagram of an exemplary functional configuration of a noise correction unit according to the first embodiment of the present invention.

Alternatively, the noise correction unit 112 may change the correction coefficient on the basis of a selection signal received from a control unit (not shown). For example, as shown in FIG. 14, the noise correction unit 112 can include a computing unit 150, a selecting unit 152, and a plurality of holding units (a first holding unit 154, a second holding unit 156, and a third holding unit 158). Each of the holding units holds a different correction coefficient. The selecting unit 152 acquires one of the correction coefficients held in the first holding unit 154, the second holding unit 156, and the third holding unit 158 on the basis of the selection signal supplied from the control unit.

For example, the control unit operates in response to an input from a user or the state of the noise and supplies the selection signal to the selecting unit 152. Thereafter, the computing unit 150 multiplies the input frequency spectrum $Y_{sup}$ by the correction coefficient selected by the selecting unit 152. Thus, the computing unit 150 computes the noise spectrum Ycomp.

Figure 15:
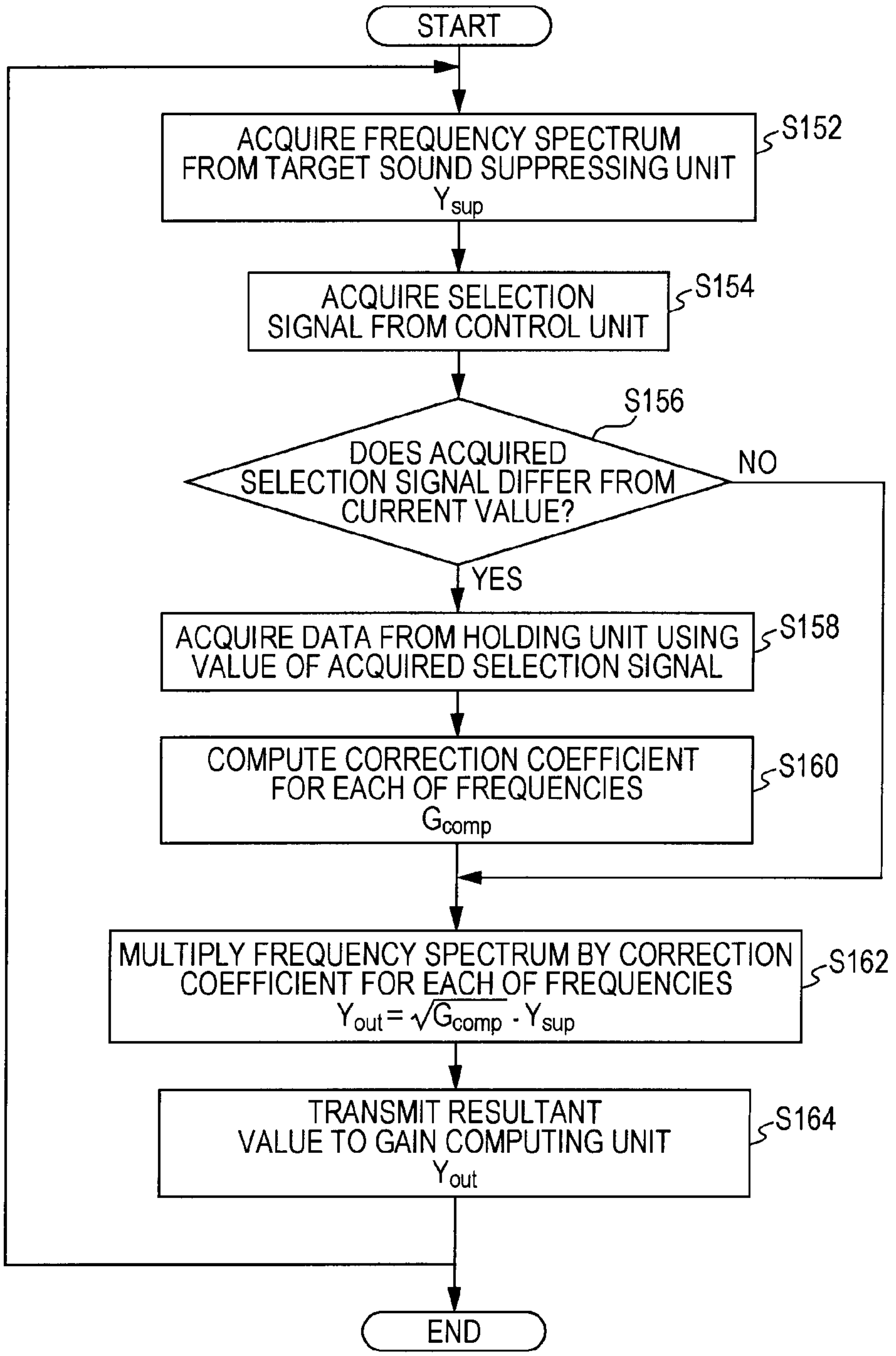
FIG. 15 is a flowchart of a noise correction process according to the first embodiment of the present invention.

The noise correction process performed when the correction coefficient is acquired on the basis of the selection signal is described next with reference to FIG. 15. As shown in FIG. 15, the frequency spectrum $Y_{sup}$ is acquired from the target sound suppressing unit 104 (step S152). Thereafter, the selection signal is acquired from the control unit (step S154). Subsequently, it is determined whether the value of the acquired selection signal differs from the current value (step S156).

If, in step S156, it is determined that the value of the acquired selection signal differs from the current value, data is acquired from the holding unit corresponding to the value of the acquired selection signal (step S158). Thereafter, the correction coefficient Gcomp is computed for each of the frequencies (step S160). Subsequently, the frequency spectrum is multiplied by the correction coefficient for each of the frequencies as follows (S162):

$$Y_{out}=\sqrt{G_{comp}}\cdot Y_{sup}$$

However, if, in step S156, it is determined that the value of the acquired selection signal is the same as the current value, the process in step S162 is performed. Thereafter, the computation result Ycomp obtained in step S162 is transmitted to the gain computing unit 106 (step S164). The above-described process is repeatedly performed by the noise correction unit 112 for each of the frequency ranges.

Figure 16:
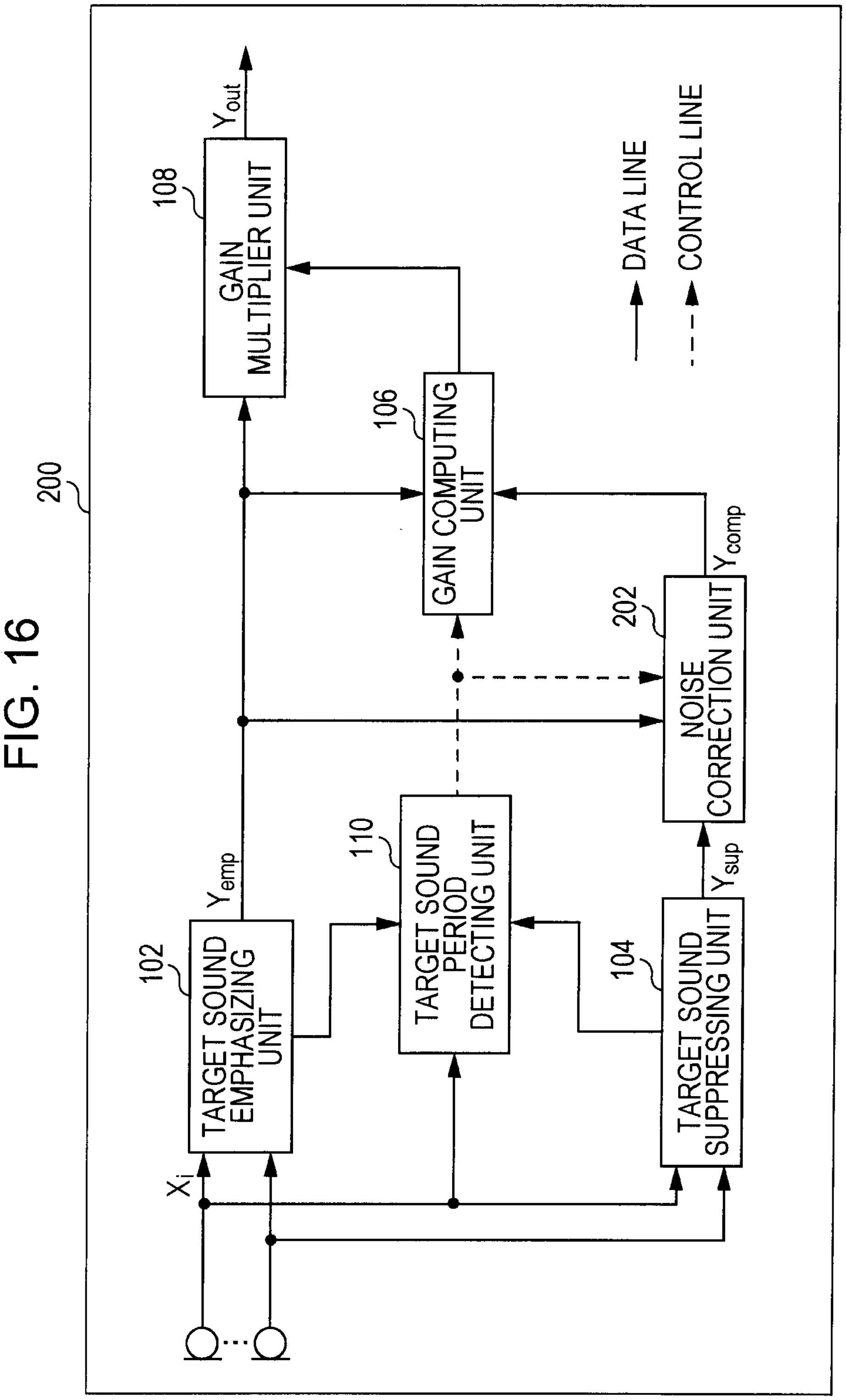
FIG. 16 is a block diagram of an exemplary functional configuration of a sound processing apparatus according to the first embodiment of the present invention.

Alternatively, like a sound processing apparatus 200 shown in FIG. 16, a noise correction unit 202 may compute the covariance of noise using the result of detection performed by the target sound period detecting unit 110. The noise correction unit 202 performs noise correction using the sound frequency component $Y_{emp}$ output from the target sound emphasizing unit 102 and the result of detection performed by the target sound period detecting unit 110 in addition to the frequency spectrum $Y_{sup}$ output from the target sound suppressing unit 104.

As described above, the first exemplary embodiment has such a configuration and features. According to the first embodiment, noise can be suppressed using the gain function G(r) having the features shown FIG. 1. That is, by multiplying the frequency component of the sound by a gain value in accordance with the energy ratio of the frequency component of the sound to the frequency component of noise, the noise can be appropriately suppressed.

In addition, by detecting whether the period is a target sound period and performing averaging control in the spectral time direction, the variance in the time direction can be decreased. Thus, a value having a small variation in the time direction can be obtained and, therefore, the occurrence of musical noise can be reduced. Furthermore, the frequency characteristic is corrected so that the ratio of the noise component N included in the sound frequency component to the noise frequency component N' is within the range R1 of G(r). In this way, when the gain value is computed, h can be made small and, therefore, the variance can be further reduced. As a result, the noise can be significantly suppressed, and the musical noise can be significantly reduced.

The sound processing apparatus 100 or 200 according to the present exemplary embodiment can be used in cell phones, Bluetooth headsets, headsets used in a call center or Web conference, IC recorders, video conference systems, and Web conference and voice chat using a microphone attached to the body of a laptop personal computer (PC).

3. Second Exemplary Embodiment

A second exemplary embodiment is described next. The first exemplary embodiment has described a technique for reducing musical noise while significantly suppressing noise using a gain function. Hereinafter, a technique for significantly simply reducing the musical noise using a plurality of microphones and spectral subtraction (hereinafter also referred to as "SS") and emphasizing target sound is described. In an SS-based technique, the following equations are satisfied:

$$|Y|^2=|X|^2-\alpha\cdot|N|^2$$

$$G^2=1-\frac{\alpha\cdot|N|^2}{|X|^2}$$

To formulate the SS-based technique, the following two descriptions are possible in accordance with how to use flooring:

Formulation 1

$$\begin{aligned}&\text{if } G^2>0\\&\quad Y=G\cdot X\\&\quad\quad=\left(\sqrt{|X|^2-\alpha\cdot|N|^2}\,\frac{X}{|X|}\right)\\&\text{else}\\&\quad Y=\beta\cdot X\end{aligned}$$

Formulation 2

$$\begin{aligned}&\text{if } G^2>G_{th}^2\\&\quad Y=G\cdot X\\&\text{else}\\&\quad Y=G_{th}\cdot X\end{aligned}$$

In Formulation 1, flooring does not occur unless G is negative. However, in Formulation 2, when G is less than $G_{th}$, the constant gain $G_{th}$ is multiplied. In Formulation 1, G can be a significantly small value and, therefore, the suppression amount of noise can be large. However, as described in the first exemplary embodiment, it is highly likely that in SS, the gain has a non-continuous value in the time-frequency representation. Therefore, musical noise is generated.

In contrast, in Formulation 2, a value smaller than $G_{th}$ (e.g., 0.1) is not multiplied. Accordingly, the amount of suppression of noise is small. However, in many time-frequency representations, by multiplying X by a constant $G_{th}$, the occurrence of musical noise can be prevented. For example, in order to reduce noise, the volume can be lowered. The above-described phenomenon can be recognized from the fact that, when the volume of sound including noise from a radio is lowered, the noise is reduced and sound having unpleasant distortion is not output. That is, in order to produce natural sound, it is effective to maintain the distortion of noise constant instead of increasing the amount of suppression of noise.

Figure 17:
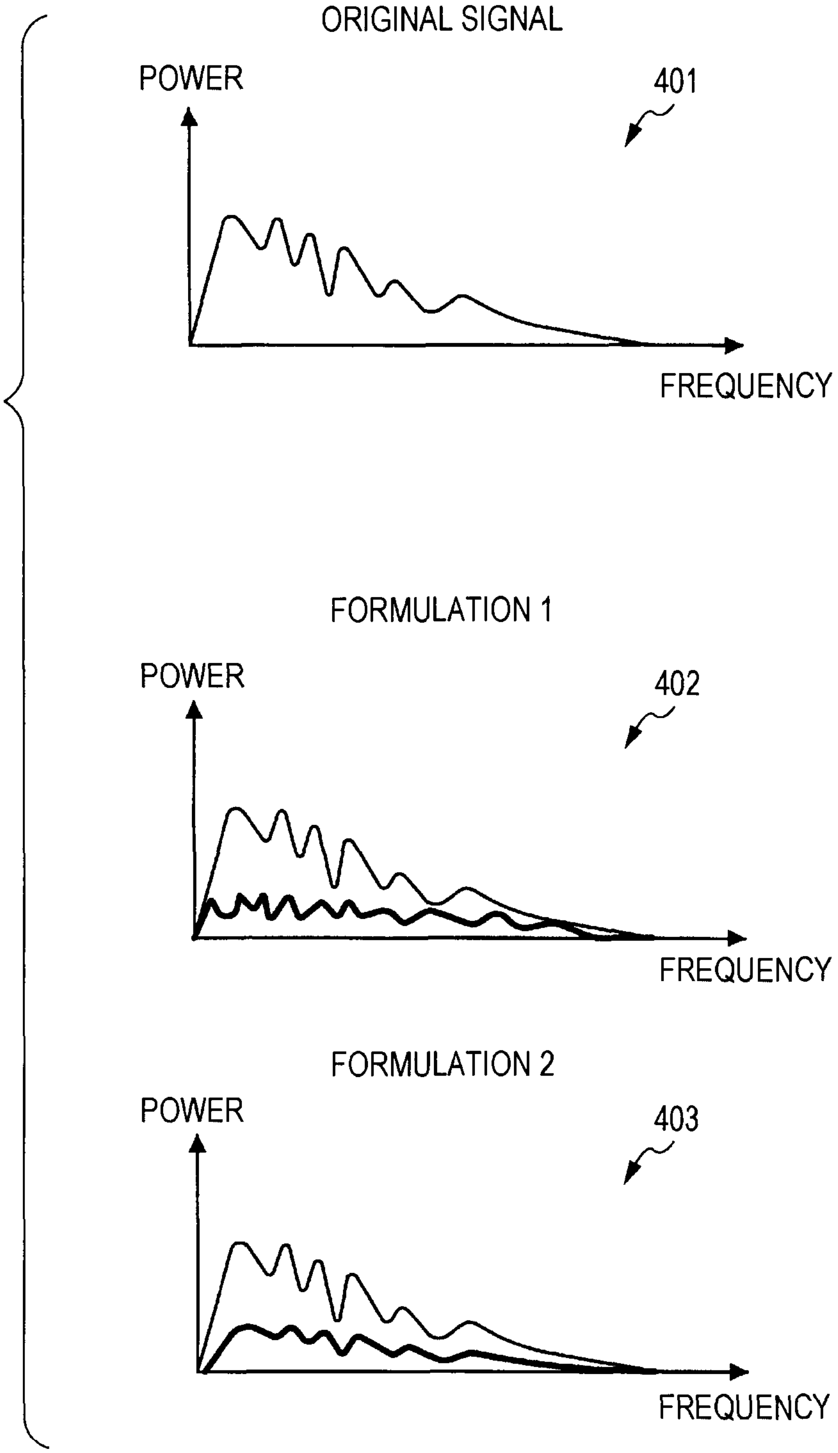
FIG. 17 illustrates the difference between output signals in different formulations.

The difference between the output signals in the above-described formulations in SS is described with reference to FIG. 17. FIG. 17 illustrates the difference between the output signals in the above-described formulations in SS. A graph 401 shown in FIG. 17 indicates the sound frequency component X output from a microphone. A graph 402 indicates the sound frequency component X after G is multiplied in Formulation 1. In this case, although the level can be lowered, the shape of the frequency is not maintained. A graph 403 indicates the sound frequency component X after G is multiplied in Formulation 2. In this case, the level is lowered with the shape of the frequency unchanged.

From the above description, it can be seen that it is desirable that the component of the sound be multiplied by a maximum value that is greater than $G_{th}$ and the component of the noise be multiplied by the value of $G_{th}$.

$$G^2 = 1 - \frac{\alpha \cdot |N|^2}{|X|^2} > G_{th}^2$$

In general, the above-described process is realized by setting α to about 2. However, in general, the process is not effective unless the estimated noise component N is correct.

Figure 18:
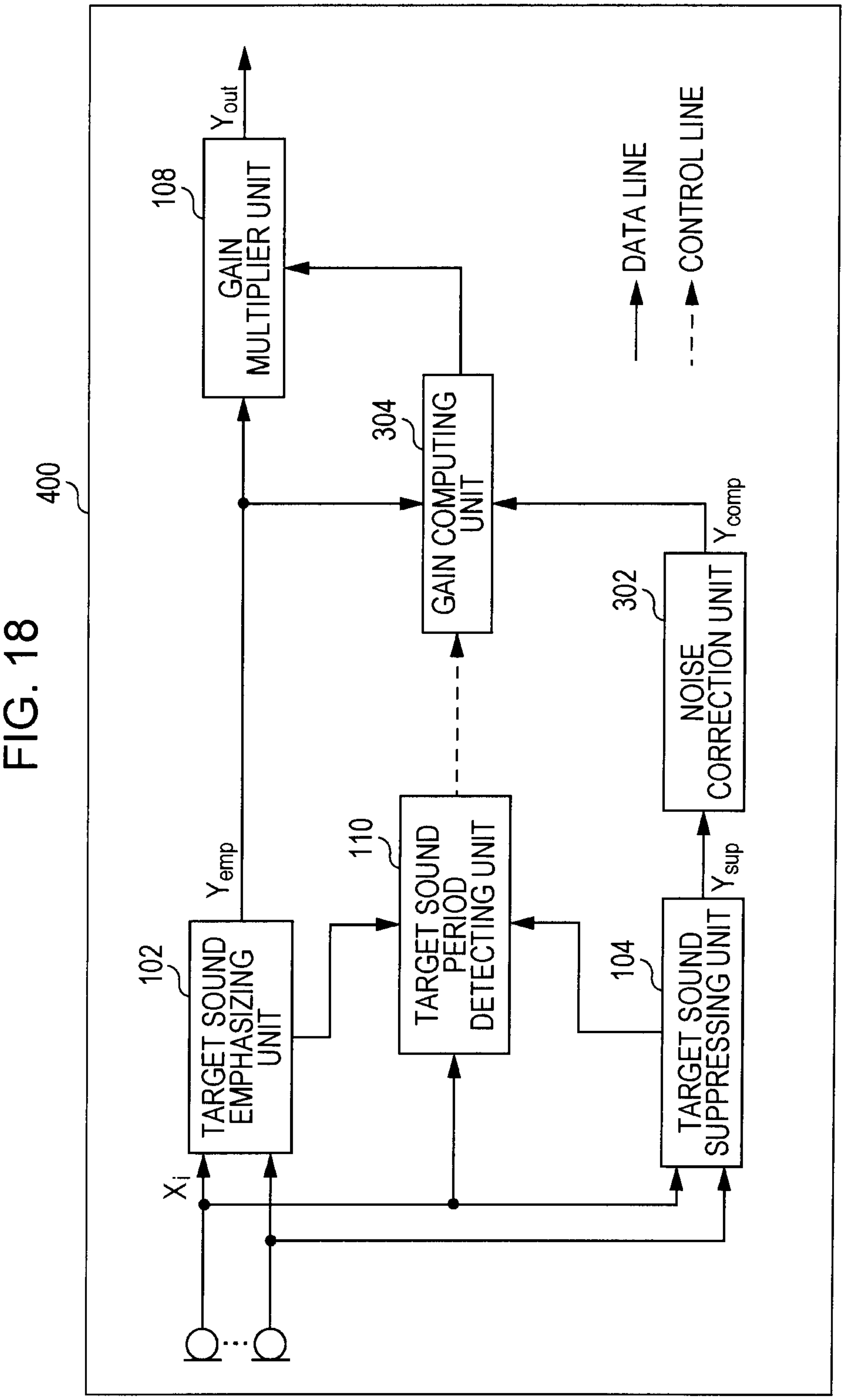
FIG. 18 is a block diagram of an exemplary functional configuration according to a second embodiment of the present invention.

A second key point of the present invention is to use a plurality of microphones. A noise component adequate for the above-described process can be effectively searched for, and a constant $G_{th}$ can be multiplied. An exemplary functional configuration of a sound processing apparatus 400 according to the present embodiment is described next with reference to FIG. 18. As shown in FIG. 18, the sound processing apparatus 400 includes a target sound emphasizing unit 102, a target sound suppressing unit 104, a target sound period detecting unit 110, a noise correction unit 302, and a gain computing unit 304. Hereinafter, in particular, the features different from those of the first exemplary embodiment are described in detail, and descriptions of features similar to those of the first exemplary embodiment are not repeated.

In the first exemplary embodiment, correction is made so that the power of $Y_{sup}$ is the same as the power of $Y_{emp}$ by using the noise correction unit 112. That is, the power of noise after the target sound is emphasized is estimated. However, according to the present embodiment, correction is made so that the power of $Y_{sup}$ is the same as the power of $X_i$. That is, the power of noise before the target sound is emphasized is estimated.

In order to estimate the noise before the target sound is emphasized, the following value computed by the noise correction unit 302:

$$Gcomp = \frac{W_{emp}^H \cdot R_n \cdot W_{emp}}{W_{sup}^H \cdot R_n \cdot W_{sup}}$$

is rewritten as the value indicated by the following expression:

$$Gcomp = \frac{R_n(i, i)}{W_{sup}^H \cdot R_n \cdot W_{sup}}$$

where $R_n(i, i)$ denotes the value of Rn in the i-th row and i-th column.

Figure 19:
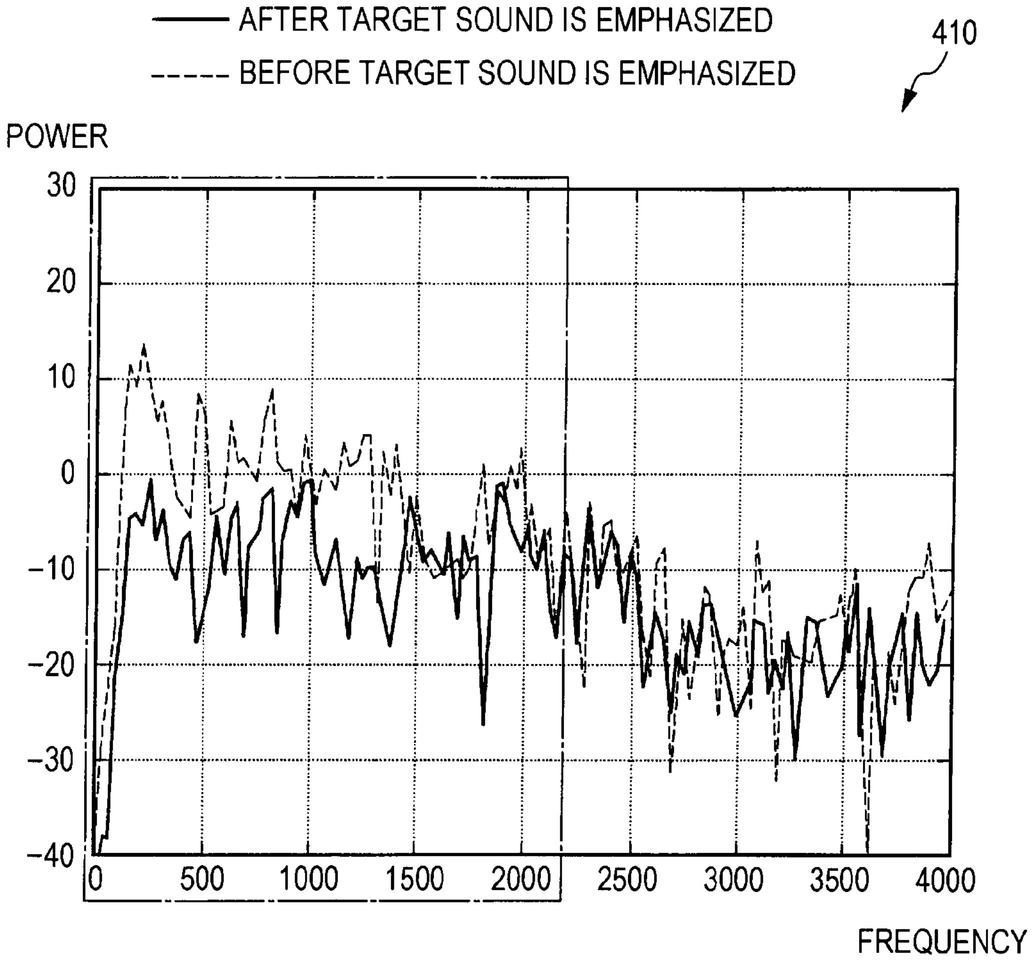
FIG. 19 is a diagram illustrating noise spectra before and after target sound is emphasized according to the second embodiment of the present invention.

In this way, the noise component included in the input of a microphone i before the target sound is emphasized can be estimated. Comparison of the actual noise spectrum after the target sound is emphasized and the actual noise spectrum before the target sound is emphasized is shown by a graph 410 in FIG. 19. As indicated by the graph 410, the noise before the target sound is emphasized is greater than the noise after the target sound is emphasized. In particular, this is prominent in the low frequency range.

Figure 20:
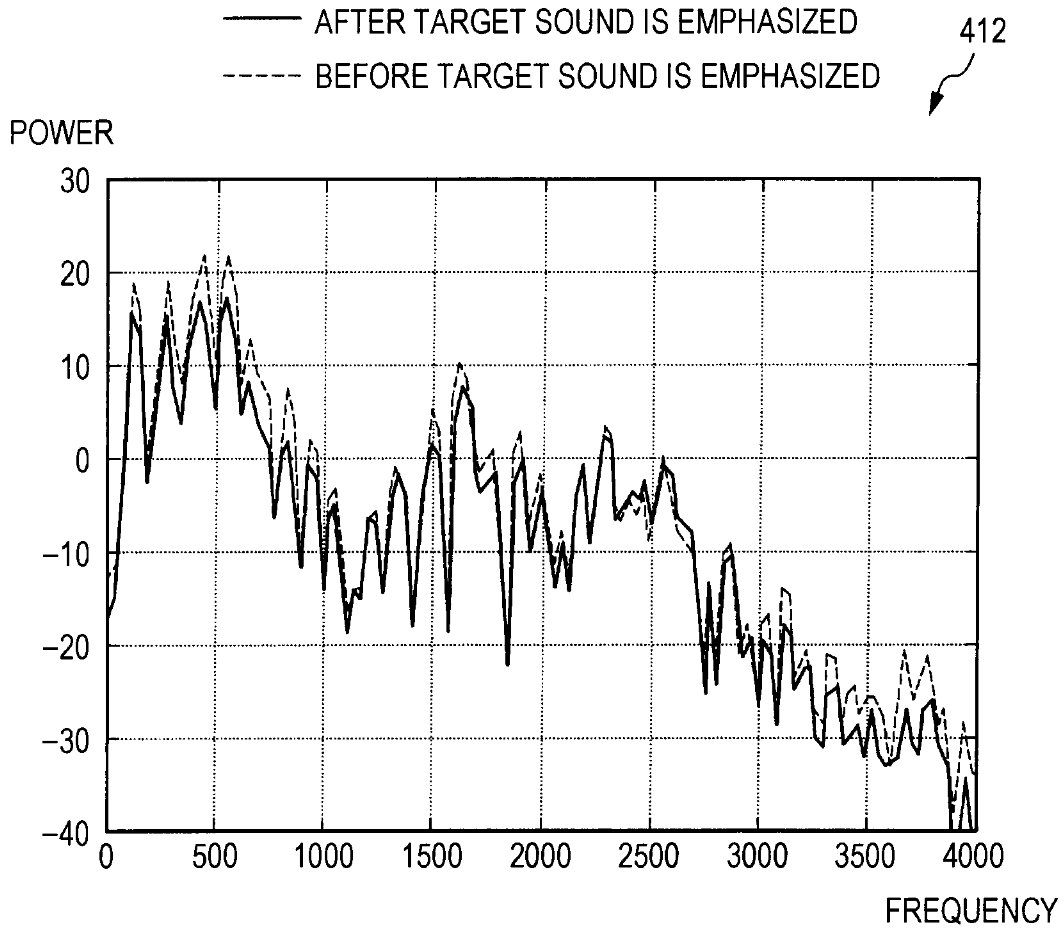
FIG. 20 is a diagram illustrating target sound spectra before and after target sound is emphasized according to the second embodiment of the present invention.

In addition, comparison of the actual noise spectrum after the target sound is emphasized and the target sound spectrum input to the microphone is shown by a graph 412 in FIG. 20. As indicated by the graph 412, the target sound component is not significantly changed before the target sound is emphasized and after the target sound is emphasized.

As described above, in SS, if an estimated noise before the target sound is emphasized is used as the noise component N, G becomes a negative value in many time-frequency representations (α=1 in this embodiment). This is because the estimated noise (N) is greater than the actually included noise component. To emphasize the target sound is to suppress the noise. Therefore, the level of noise before the target sound is emphasized is higher than that after the target sound is emphasized. This effect can be obtained through the process using a plurality of microphones.

In addition, the noise component is multiplied by a constant gain $G_{th}$. In contrast, the target sound is multiplied by a value close to 1 than $G_{th}$, although the target sound is slightly degraded. Accordingly, even when the gain function based on SS is used, sound having small musical noise can be acquired. In this way, even when a spectral subtraction based technique is used, musical noise can be simply reduced and sound emphasis can be performed by using the feature of a microphone array process (i.e., by estimating the noise component before the target sound is emphasized and using the noise component).

While the exemplary embodiments of the present invention have been described with reference to the accompanying drawings, the present invention is not limited thereto. It should be understood by those skilled in the art that various modifications, combinations, sub-combinations and alterations may occur depending on design requirements and other factors insofar as they are within the scope of the appended claims or the equivalents thereof.

For example, the steps performed in the sound processing apparatus 100, 200, and 400 are not necessarily performed in the time sequence described in the flowcharts. That is, the steps performed in the sound processing apparatus 100, 200, and 400 may be performed concurrently even when the processes in the steps are different.

In addition, in order to cause the hardware included in the sound processing apparatus 100, 200, and 400, such as a CPU, a ROM, and a RAM, to function as the configurations of the above-described sound processing apparatus 100, 200, and 400, a computer program can be produced. Furthermore, a storage medium that stores the computer program can be also provided.

The present application contains subject matter related to that disclosed in Japanese Priority Patent Application JP 2010-059623 filed in the Japan Patent Office on Mar. 16, 2010, the entire contents of which are hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A sound processing apparatus comprising:

a target sound emphasizing unit configured to acquire a sound frequency component by emphasizing target sound in input sound in which the target sound and noise are mixed;

a target sound suppressing unit configured to acquire a noise frequency component by suppressing the target sound in the input sound;

a gain computing unit configured to compute a gain value to be multiplied by the sound frequency component using a predetermined gain function in accordance with the sound frequency component and the noise frequency component; and a gain multiplier unit configured to multiply the sound frequency component by the gain value;

wherein the gain value computed based on the predetermined gain function is less than a first predetermined value and a slope of the predetermined gain function is less than a second predetermined value when an energy ratio of the sound frequency component to the noise frequency component is within predetermined range.

2. The sound processing apparatus according to claim 1, wherein the sound frequency component comprises a target sound component and a noise component, and wherein the target sound suppressing unit suppresses the noise component included in the sound frequency component by multiplying the sound frequency component by the gain value.

3. The sound processing apparatus according to claim 1, wherein the gain value is computed based on only noise included in the noise frequency component.

4. The sound processing apparatus according to claim 1, wherein the gain value is less than the first predetermined value and the gain function has a gain curve with the slope less than the second predetermined value in a noise concentration range in which a noise ratio is concentrated in terms of the energy ratio of the sound frequency component to the noise frequency component, wherein the predetermined range of the energy ratio is 0 to 2.

5. The sound processing apparatus according to claim 4, wherein the slope of the gain curve is less than a greatest slope of the gain function in a range other than the noise concentration range.

6. The sound processing apparatus according to claim 1, further comprising a target sound period detecting unit configured to:

detect a period for which the target sound included in the input sound is present; and compute an average of a power spectrum of the sound frequency component and a power spectrum of the noise frequency component in accordance with the detected period.

7. The sound processing apparatus according to claim 6, wherein the gain computing unit is configured to:

select a first smoothing coefficient when the detected period is the period for which the target sound is present;

select a second smoothing coefficient when the detected period is the period for which the target sound is not present; and compute an average of the power spectrum of the sound frequency component and the power spectrum of the noise frequency component.

8. The sound processing apparatus according to claim 6, wherein the gain value is computed based on the averaged power spectrum of the sound frequency component and the averaged power spectrum of the noise frequency component.

9. The sound processing apparatus according to claim 1, further comprising a noise correction unit configured to:

correct the noise frequency component such that a magnitude of the noise frequency component corresponds to a magnitude of a noise component included in the sound frequency component;

wherein the gain value is based on the corrected noise frequency component.

10. The sound processing apparatus according to claim 9, wherein the noise frequency component is corrected in response to a user operation.

11. The sound processing apparatus according to claim 9, wherein the noise frequency component is corrected in accordance with a state of detected noise.

12. A sound processing method comprising:

in a sound processing apparatus:

acquiring a sound frequency component by emphasizing target sound in input sound in which the target sound and noise are mixed;

acquiring a noise frequency component by suppressing the target sound in the input sound;

computing a gain value to be multiplied by the sound frequency component based on a gain function, wherein the gain value is less than a first predetermined value and a slope of the gain function is less than a second predetermined value when an energy ratio of the sound frequency component to the noise frequency component is within predetermined range; and multiplying the sound frequency component by the gain value.

13. A non-transitory computer-readable storage medium having stored thereon, a computer program having at least one code section, the at least one code section being executable by a computer for causing the computer to perform steps comprising:

acquiring a sound frequency component by emphasizing target sound in input sound in which the target sound and noise are mixed;

acquiring a noise frequency component by suppressing the target sound in the input sound;

computing a gain value to be multiplied by the sound frequency component using a predetermined gain function in accordance with the sound frequency component and the noise frequency component; and multiplying the sound frequency component by the gain value;

wherein the gain value computed based on the predetermined gain function is less than a first predetermined value and a slope of the predetermined gain function is less than a second predetermined value when an energy ratio of the sound frequency component to the noise frequency component is within predetermined range.

14. The non-transitory computer-readable storage medium according to claim 13, wherein the sound frequency component comprises a target sound component and a noise component and wherein multiplying the sound frequency component by the gain value suppresses the noise component included in the sound frequency component.

15. The non-transitory computer-readable storage medium according to claim 13, wherein the gain value is computed based on only noise included in the noise frequency component.

16. The non-transitory computer-readable storage medium according to claim 13, wherein the gain value is less than the first predetermined value and the gain function has a gain curve with a slope less than the second predetermined value in a noise concentration range in which a noise ratio is concentrated in terms of the energy ratio of the sound frequency component to the noise frequency component, wherein the predetermined range of the energy ratio is 0 to 2.

17. The non-transitory computer-readable storage medium according to claim 16, wherein the slope of the gain curve is less than the greatest slope of the gain function in a range other than the noise concentration range.

18. The non-transitory computer-readable storage medium according to claim 13, wherein the at least one code section causes the computer to perform steps comprising:

detecting a period for which the target sound included in the input sound is present; and computing an average of a power spectrum of the sound frequency component and a power spectrum of the noise frequency component in accordance with the detected period.

19. The non-transitory computer-readable storage medium according to claim 18, wherein the at least one code section causes the computer to perform steps comprising:

selecting a first smoothing coefficient when the detected period is the period for which the target sound is present; and selecting a second smoothing coefficient when the detected period is the period for which the target sound is not present; and computing an average of the power spectrum of the sound frequency component and the power spectrum of the noise frequency component.

20. The non-transitory computer-readable storage medium according to claim 18, wherein the gain value is computed based on the averaged power spectrum of the sound frequency component and the averaged power spectrum of the noise frequency component.

* * * * *